(12) United States Patent
Wong

(10) Patent No.: US 7,346,649 B1
(45) Date of Patent: Mar. 18, 2008

(54) METHOD AND APPARATUS FOR NETWORK CONTENT DISTRIBUTION USING A PERSONAL SERVER APPROACH

(76) Inventor: Alexander Y. Wong, 459 Homer Ave., Unit 2, Palo Alto, CA (US) 94301

( * ) Notice: Subject to any disclaimer, the term of this patent is extended or adjusted under 35 U.S.C. 154(b) by 747 days.

(21) Appl. No.: 09/870,059

(22) Filed: May 29, 2001

Related U.S. Application Data

(60) Provisional application No. 60/208,963, filed on May 31, 2000.

(51) Int. Cl.
*G06F 15/16* (2006.01)

(52) U.S. Cl. .................. 709/203; 709/217; 709/224; 345/329; 345/330

(58) Field of Classification Search ............ 709/218, 709/224, 227, 228, 217, 231, 232, 246, 203, 709/220; 707/101, 513; 345/329, 330
See application file for complete search history.

(56) References Cited

U.S. PATENT DOCUMENTS

| | | | | |
|---|---|---|---|---|
| 5,727,145 | A * | 3/1998 | Nessett et al. ............... 726/5 |
| 5,732,219 | A * | 3/1998 | Blumer et al. ............. 709/227 |
| 5,928,324 | A * | 7/1999 | Sloan ......................... 709/203 |
| 6,195,696 | B1 * | 2/2001 | Baber et al. ............... 709/223 |
| 6,216,141 | B1 * | 4/2001 | Straub et al. .............. 715/513 |
| 6,295,521 | B1 * | 9/2001 | DeMarcken et al. ........... 705/6 |
| 6,311,214 | B1 * | 10/2001 | Rhoads ...................... 709/217 |
| 6,351,467 | B1 * | 2/2002 | Dillon ........................ 370/432 |
| 6,360,254 | B1 * | 3/2002 | Linden et al. ............. 709/219 |
| 6,438,594 | B1 * | 8/2002 | Bowman-Amuah ......... 709/225 |
| 6,557,054 | B2 * | 4/2003 | Reisman ...................... 710/33 |
| 6,564,260 | B1 * | 5/2003 | Baber et al. ............... 709/223 |
| 6,564,263 | B1 * | 5/2003 | Bergman et al. ............ 709/231 |
| 6,587,867 | B1 * | 7/2003 | Miller et al. ............... 709/200 |
| 6,622,171 | B2 * | 9/2003 | Gupta et al. ............... 709/231 |
| 6,675,387 | B1 * | 1/2004 | Boucher et al. ............ 725/105 |

(Continued)

OTHER PUBLICATIONS

"Imagine a wide-open future of Web innovation", Epicentric Corporation, 2001, 6 pages, brochure.

(Continued)

*Primary Examiner*—Khanh Dinh
(74) *Attorney, Agent, or Firm*—Hickman Palermo Truong & Becker LLP

(57) ABSTRACT

A method and apparatus providing network content distribution using a personal server approach is disclosed. A receiving client is provided with a personal server that can select, aggregate, and organize one or more channels of content in a virtual display space of the client. Selection, aggregation, and organization information is stored only locally. Raw data representing content is stored at a logically separate server across a network. Periodically the personal server requests updated content from the server and stores the content in a local channel database. The personal server synthesizes or generates one or more electronic documents containing the content, based on user-defined virtual space specifications and page organization information. The personal server then presents the electronic documents to a browser or other client element. Unlike past approaches that involve distributing fully formatted content to clients, the personal server can receive raw data, replace tokens in the raw data with other content, obtain embedded channel data, and render pages locally, using a conventional browser, without requiring use of a proprietary viewer, and without sending channel selections and other personal information across the network to an untrusted server.

38 Claims, 30 Drawing Sheets

U.S. PATENT DOCUMENTS 6,769,009 B1 * 7/2004 Reisman .................... 709/201
2003/0097426 A1    5/2003 Parry

OTHER PUBLICATIONS

"Epicentric Foundation Server 3.5", Epicentric Corporation, 2001, 7 pages, brochure.

"Corporate Portals-Making the Web Work For You", Epicentric Corporation, 2001, downloaded Aug. 21, 2001, 2 pages.

"Epicentric Foundation Server 3.5, the Portal Platform Standard-the quickest, easiest, and most powerful way to build and deliver Web services across diverse business communities", Epicentric Corporation, 2001, downloaded Aug. 21, 2001, 20 pages.

"The power behind aggregation", Yodlee Inc., downloaded Aug. 21, 2001, http://www.yodlee.com, 13 pages.

"Snippets Software", downloaded Aug. 21, 2001, http://www.snippets.com/products, 12 pages.

A. Wong et al., "Operating System Support for Multi-User, Remote, Graphical Interaction," Proceedings of the 2000 USENIX Annual Technical Conference, published by USENIX.org, Apr. 20, 2000, pp. 183-197.

ANONYMOUS, "What is X Window System," Whatis.com, downloaded Aug. 22, 2007, 3 pages.

* cited by examiner

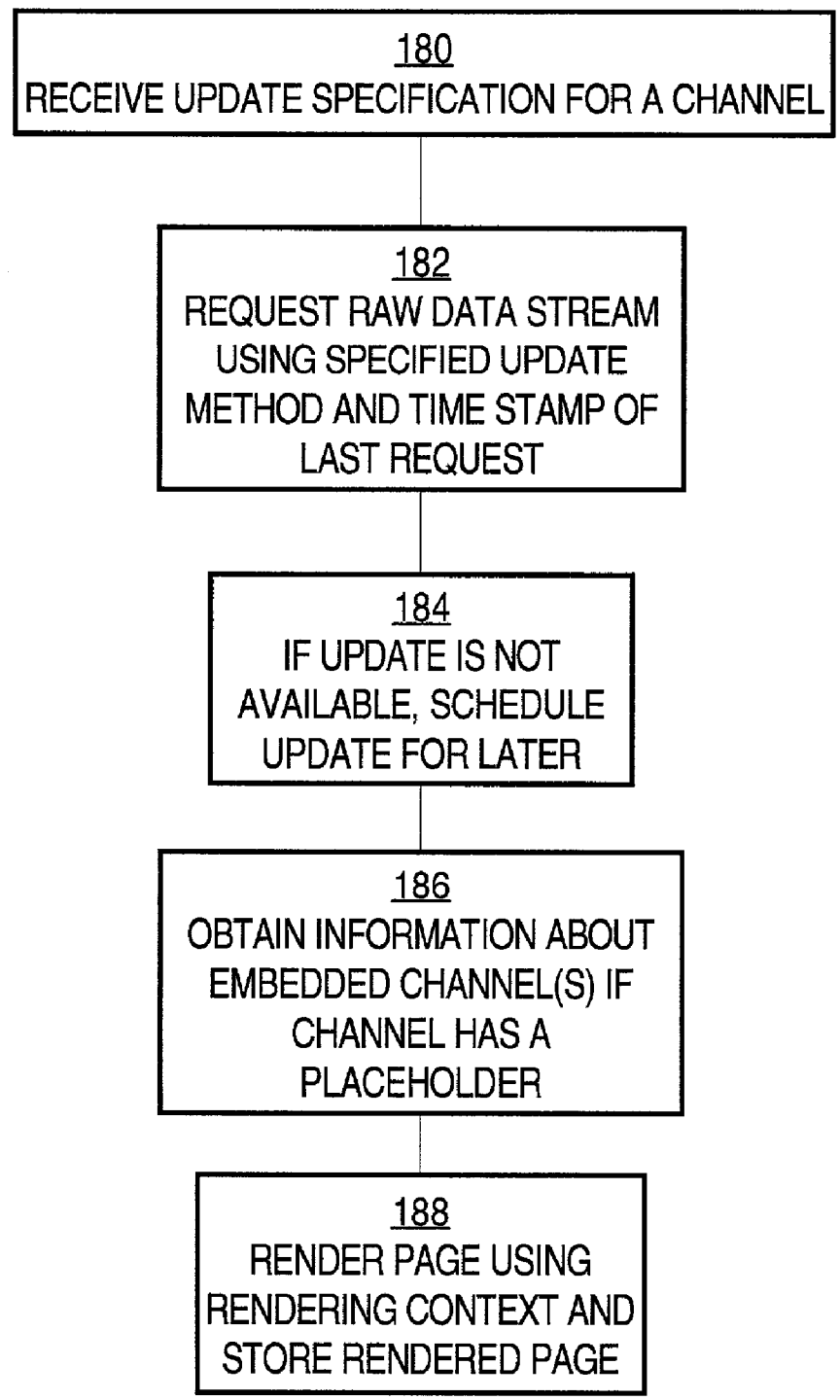

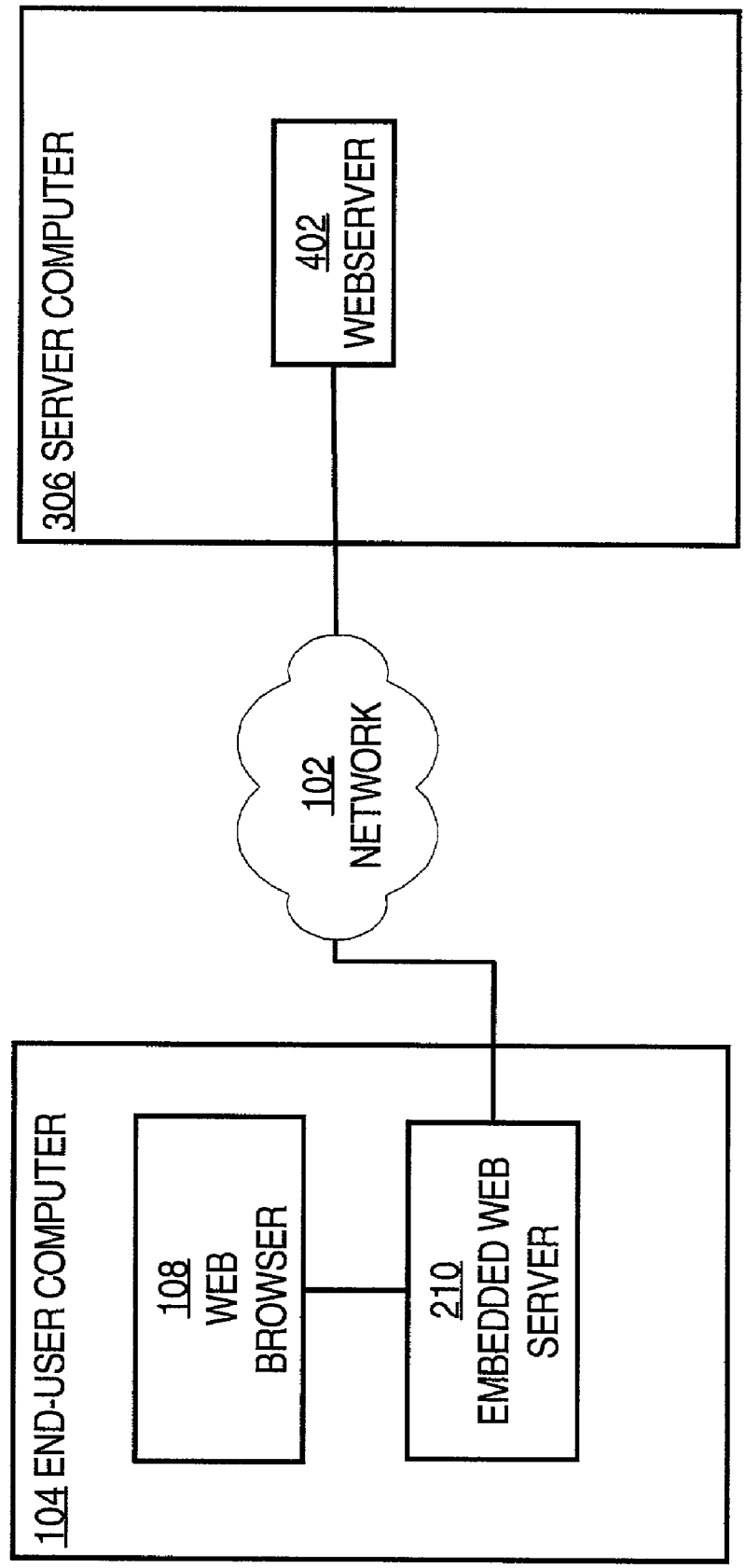

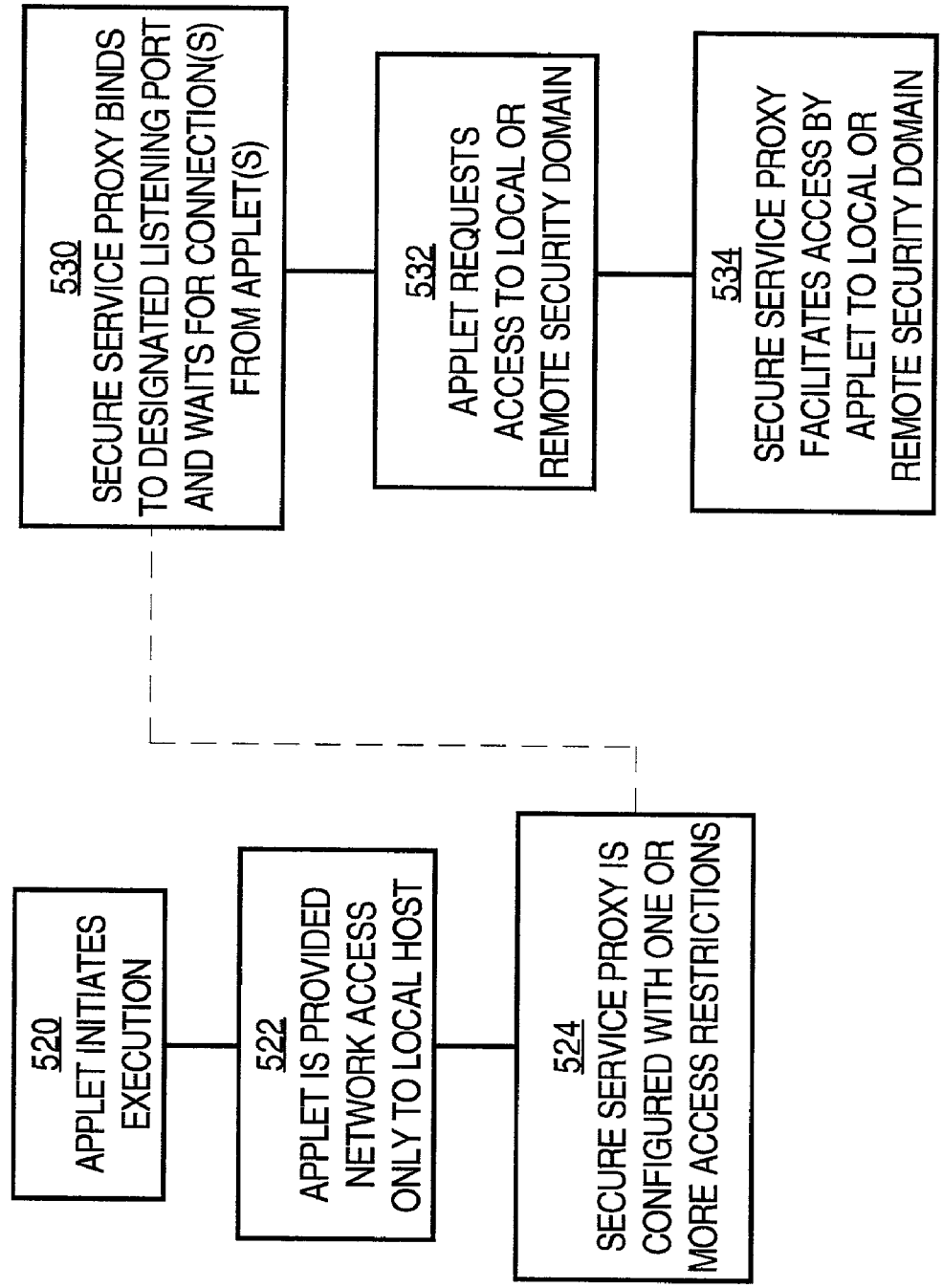

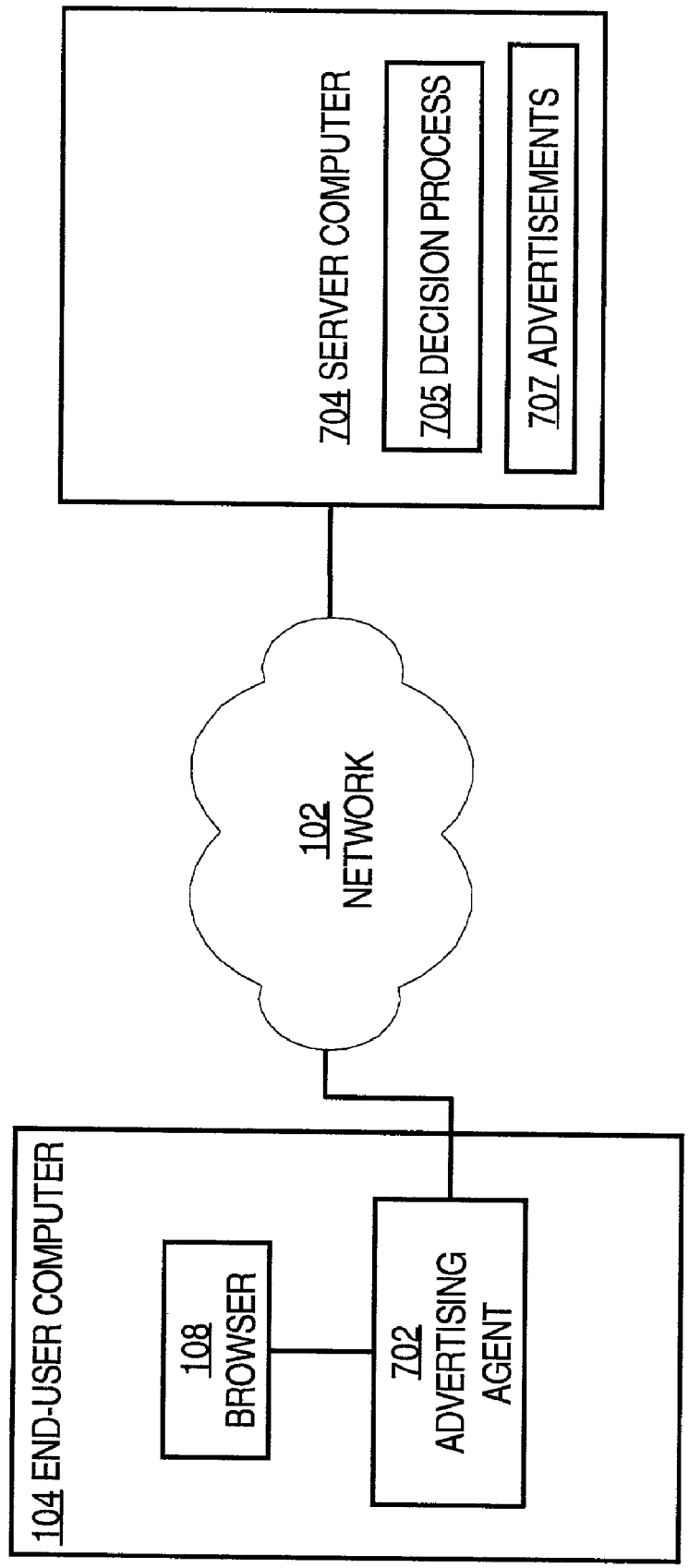

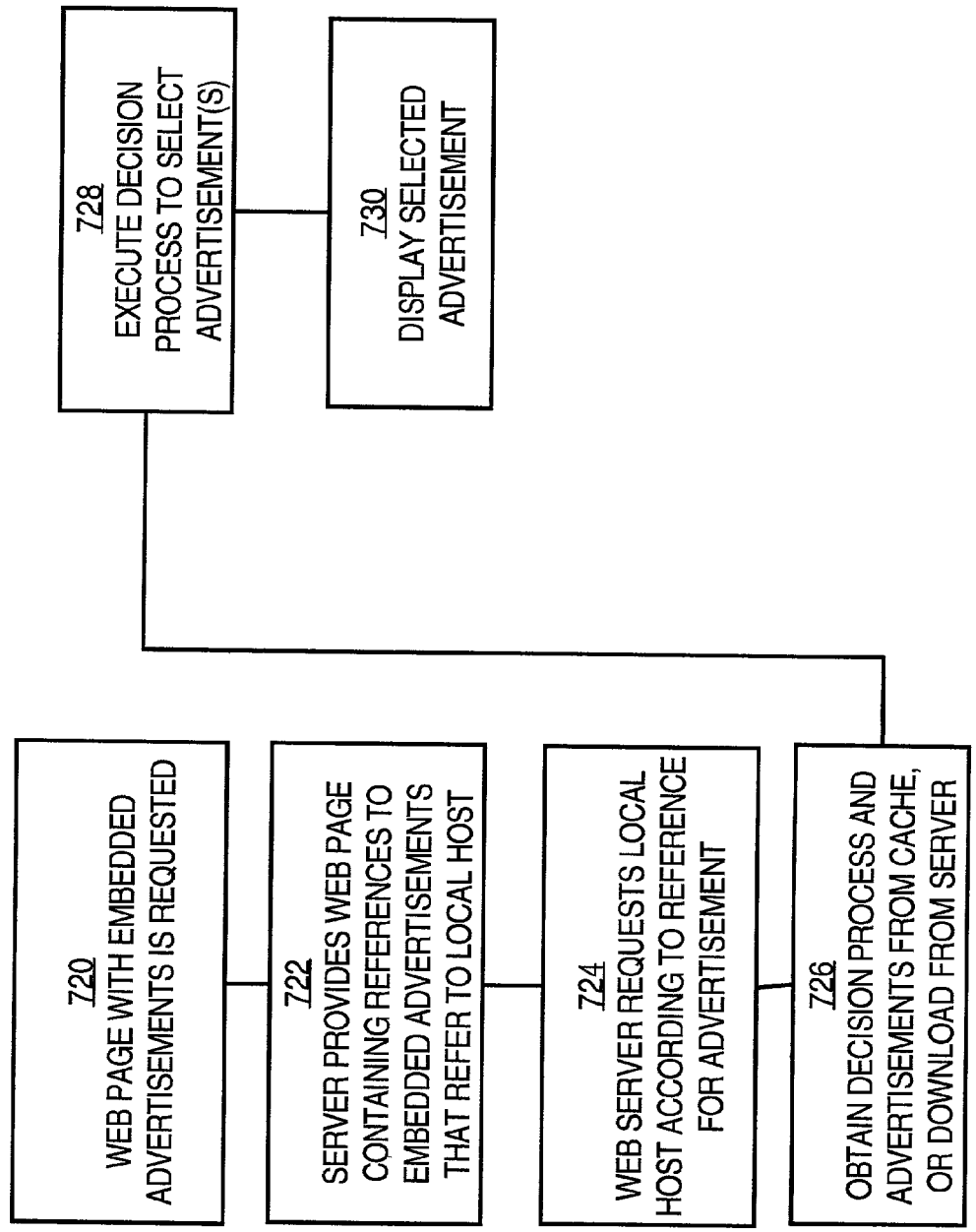

METHOD AND APPARATUS FOR NETWORK CONTENT DISTRIBUTION USING A PERSONAL SERVER APPROACH

CROSS-REFERENCE TO RELATED APPLICATIONS

This application is related to and claims domestic priority under 35 U.S.C. 119(e) from prior U.S. provisional application Ser. No. 60/208,963, filed May 31, 2000, "Method for Internet Content Distribution," by inventor Alexander Y. Wong, the entire disclosure of which is hereby incorporated by reference as if fully set forth herein.

FIELD OF INVENTION

The present invention generally relates to communication of multimedia content using computer networks. The invention relates more specifically to a method and apparatus providing improved network content distribution using a personal server approach.

BACKGROUND OF THE INVENTION

Public computer networks and local area networks are now widely used for communication of a variety of information among content sources, such as server computers, and content consumers, such as end-user computers that act as clients of the server computers. The information communicated from a content source to a content consumer may include text, music, video, telephone calls, digital files, or other information that is broadly termed "content." The networks that carry such content may include local area networks, wide area networks, virtual private networks, or the worldwide interconnected internetworks known as the Internet.

Several prior content distribution approaches are known involving end-user computers, server computers, and public networks. In this context, an end-user computer is a computer system whose primary function is to serve a single local human user at one time through an interface device such as a keyboard, trackball, mouse, etc., and includes a personal computer, Internet appliance, personal digital assistant, etc. The end-user computer executes a Web Browser, which is one or more software elements that communicate with Web servers using the Hyper Text Transfer Protocol (HTTP). The browser can download and render documents that are formatted in Hyper Text Markup Language (HTML) and Extensible Markup Language (XML), and supports hyper-linking, among other features. Examples of such Web browsers include Microsoft Internet Explorer and Netscape Communicator.

The term "server computer" refers to a computer system whose primary function is to serve large numbers of remote end-user computers through programmatic interfaces such as multiplexed network connections. These systems are typically more expensive and more powerful than end-user computers, and are often professionally managed. End-users do not interact directly with server computers.

The term "public network" refers to one or more local area networks, wide area networks, virtual private networks, or the worldwide interconnected internetworks known as the Internet. Nodes connected to such networks communicate using Transmission Control Protocol/Internet Protocol (TCP/IP).

In one content distribution approach, one or more end-user computers each receive content over a public network from a server computer that is logically in a central location with respect to the end-user computers. An end user selects the content in which the end user is interested. The content is organized in channels. Each channel comprises a stream of content from a given server computer that is updated on demand or at regular intervals. Selecting a channel is termed subscribing to the channel. A user may select channels by submitting an HTML form or clicking on a link through a Web browser. The Web browser then transmits the selection information to the server computer where it is stored.

Given the list of channels selected by the end user, an aggregator fetches the latest channel content from the various channel sources which may be local to the end-user computer or on a remote server computer. This step may be performed asynchronously from end-user interaction, with the fetched content being cached at the server computer. The aggregator may be combined with a Web server and implemented as an Aggregator/Web Server. The Aggregator/Web server is software executed on one or more server computers and including a Web server that serves files using HTTP. Examples of such Web servers include Apache, Microsoft Internet Information Server, and Netscape Enterprise Server. Web servers typically require specialized expertise to configure and maintain, and may interact with other server software that aggregates raw data from local and remote databases and server computers to generate Web documents, which are then served to end-user computers by the Web server.

The end user then organizes the content into a particular spatial layout. In other approaches, this typically involves choosing a vertical ordering within one of a fixed number of columns. The end user performs this step through the Web browser, which transmits the information back to the server computer where it is stored. Using the content fetched from channel servers and the organization specified by the end user, the server computer synthesizes an HTML document. The synthesized HTML document is delivered over a network connection to the Web browser on the end-user computer for presentation to the end-user. Examples of commercial services that embody this approach are My Yahoo!, Yodlee (available at the Web site yodlee.com), and Epicentric.

A second approach focuses on the use of a proprietary content viewer. In this approach, an end user selects the content in which the user is interested, by interacting directly with a content viewer or Web browser to make selections. The selections are stored in the content viewer on the end-user computer. The Content Viewer refers to proprietary software that is typically owned by a third party. The Content Viewer runs on an end-user computer and communicates with server computers using HTTP and other standard or proprietary protocols. In other approaches, the content viewers may be implemented as graphical toolbars that dock to the edges of the end-user computer's screen or to a Web browser. In particular, a content viewer does not serve content to standard Web browsers over HTTP or TCP/IP, and displays content in a proprietary fashion.

Given the list of channels selected by the end user, the content viewer fetches the latest channel content from the various content sources. This step may be performed asynchronously from end-user interaction, with the fetched content being cached at the end-user computer. The end-user then organizes the content into a particular spatial layout. In other approaches, this typically involves choosing a button or menu position on a toolbar. The end user interacts directly with the content viewer to organize the content. The organization is stored in the content viewer. Using the content fetched from channel servers and the organization specified by the end user, the content viewer synthesizes the content into its proprietary display format. The synthesized content is then presented to the end user though the content viewer's proprietary interface. Examples of commercial services that use this approach are PointCast and Snippets.

Based on the foregoing, there is a clear need for improved ways to deliver content over a public network. For example, in prior approaches, remote intermediary servers are required for content to be delivered to end-users. Thus, there is a need for a way to eliminate such intermediary servers.

Further, in other approaches, a proprietary content viewer is sometimes required. There is a need for a way to enable an end-user to receive channel content without having to obtain, load, install or use a proprietary content viewer.

Also, in prior approaches, an end-user's content selection choices generally must be delivered over the Internet to the intermediary server, exposing the end-user to eavesdroppers. There is a need for a way to communicate channel choices that does not require selection choices to be delivered over the Internet, enhancing privacy.

Also in prior approaches, the synthesized Web page must be delivered to the end-user computer over his or her Internet connection, which is often slow and leads to high page load latency. There is a need for a way to reduce page load latency. In other approaches, if the intermediary server is under heavy load, performance for each end-user diminishes. There is a need for a way in which performance remains constant regardless of the number of global users of the personal server. Further, in other approaches, if the intermediary server is out of service, no end-user can access her page. There is a need for a way to ensure that a page of an end-user is unavailable only when the computer of the end-user is out of service.

In still other approaches, if a channel provider server computer is out of service, the channel raw data stream is unavailable. There is a need for a way to distribute channel raw data streams over the Internet's e-mail infrastructure, eliminating the problem of a single point of failure. Yet another problem of past approaches is that channel publishing requires expensive hardware, a dedicated connection to the Internet, and expertise in configuring and maintaining software. An approach that avoids these requirements is highly desirable.

Another problem of conventional online processing relates to name resolution. In one prior approach, name resolution is accomplished using the following process. The end-user enters a URL into a TCP/IP application, such as a Web browser. The application must first resolve the host name in the URL to an IP address. To do this, the browser sends a request to the TCP/IP networking stack in the operating system on which the Web browser is running. The TCP/IP stack may have the translation cached, in which case it can reply immediately to the Web browser.

Alternatively, if the translation is not cached, the TCP/IP stack makes a request to an external DNS server. The external DNS server resolves the name. This step may include contacting other servers. The DNS server sends the translation back to the end-user computer's TCP/IP stack. The TCP/IP stack sends the translation back to the TCP/IP application, which then proceeds to make the connection using the IP address.

Based on the foregoing, there is a clear need for an alternative private naming system on the Internet. In prior approaches, using an alternative naming system other than DNS requires a modified Web browser. There is a need for an approach that provides alternative naming with any browser, or any other TCP/IP application.

Further, in other approaches, alternative naming requires a centralized server to maintain name mappings. There is a need for an approach in which no such centralized server is required.

In still other approaches, alternative naming is global, and does not allow two different users to use the same name to refer to different addresses. There is a need for an approach that permits two different users to use the same name to refer to different addresses.

Another drawback found in current network computing approaches relates to security control over applets that execute within a "sandbox" environment, such as Java® applets.

A document that is delivered to a Web browser may include one or more embedded applets. In general, an applet is a relatively compact executable program that is received over a network and executed locally at an end-user computer under the control of a local interpreter or virtual machine. The Java® language, for example, may be used to write applets that are communicated from a server over a network to a client computer. A Java Virtual machine executes the applets. The Java Virtual Machine typically is integrated with a client computer network application such as a Web browser.

A security concern associated with applets is that an applet received from an untrusted server may attempt to cause the client computer to carry out unauthorized operations, such as deletion of files, reading configuration information or personal user data and forwarding such data to the server, etc. Accordingly, most Web browsers execute applets within a confined security domain or "sandbox" that restricts the resources that an applet can use. For example, a Web browser may restrict access of applets to security domains such as local persistent storage on the end-user computer and network connectivity to arbitrary servers on the Internet. Typically, the only external access allowed the applet is network connectivity to the server from which the Web browser loaded the applet.

Web browsers sometimes allow the security restrictions or boundaries of the sandbox to be configured by the operator, but with quite coarse granularity. For example, in one prior approach, the only permitted configuration operation is to enable or disable access to local persistent storage and network connectivity.

Based on the foregoing, there is a clear need for a method that provides for fine-grained security control over applets restricted to a sandbox.

A related problem of prior approaches is that an applet cannot access network servers other than the one from which it was loaded. There is a need for an approach that enables an applet to access any network server safely. Further, in prior approaches, applets cannot access local resources like other processes and local storage. There is a need to enable applets to safely have such access. Yet another related problem of past approaches is that cross-applet communication is dependent on Web browser support. There is a need for an approach that enables cross-applet communication regardless of the browser.

Yet another problem associated with online computing relates to targeted advertising on the Internet. In past approaches, targeted advertising requires disclosure of personal information of the end-user to the advertiser. Thus, there is a clear need for a method and apparatus for disclosure-free targeted advertising on the Internet. In particular, there is a need for an approach in which no disclosure is required, protecting end-user privacy.

Still another problem relating to online computing involves intercommunication between intermittently connected network nodes over e-mail infrastructure on the Internet. In past approaches, software processes running on intermittently connected nodes of a network have no way to communicate when no connection is present. Thus, there is a need for a method providing for such communication in the absence of a connection. There is a specific need for an approach that uses available network infrastructure to provide such communication, so that no additional infrastructure is necessary, and the system can be implemented with little cost.

Another problem associated with online computing relates to clipping Web pages and embedding them in other Web pages. In past approaches, clipping a Web page involves parsing its HTML code and directly embedding a subset of the HTML code into another page. There is a need for a method for clipping Web pages and embedding them in other pages that avoids disadvantages of this approach. In particular, there is a need for an approach in which HTML parsing is not required.

SUMMARY OF THE INVENTION

The foregoing needs, and other needs and objects that will become apparent for the following description, are achieved in the present invention, which comprises, in one aspect, a method and apparatus for publishing, selecting, aggregating, organizing, synthesizing, and presenting content using a personal server approach. A receiving client is provided with a personal server that can select, aggregate, and organize one or more channels of content in a virtual display space of the client. Selection, aggregation, and organization information is stored only locally. Raw data representing content is stored at a logically separate server across a network. Periodically the personal server requests updated content from the server and stores the content in a local channel database. The personal server synthesizes or generates one or more electronic documents containing the content, based on pre-defined virtual space specifications and page organization information. The personal server then presents the electronic documents to a browser or other client element. Unlike past approaches that involve distributing fully formatted content to clients, the personal server can receive raw data, replace tokens in the raw data with other content, obtain embedded channel data, and render pages locally, using a conventional browser, without requiring use of a proprietary viewer, and without sending channel selections and other personal information across the network to an untrusted server.

According to one feature, the use of TCP/IP loopback permits server components to be moved to end-user computers such that intermediary servers are no longer needed. A personal server is disclosed wherein use of TCP/IP loopback permits the personal server to interoperate with any end-user Web browser. The integrated nature of the personal server disclosed herein does not require selection choices to be delivered over the Internet, enhancing privacy. Performance is enhanced, since selection and layout choices do not need to be delivered over potentially slow Internet connections. Simplicity is improved by tying closely together components that in other approaches are distributed over a number of computers. The use of TCP/IP loopback dramatically reduces page load latency. As a result of the reduction in page load latency, the complexity and sophistication of those pages may increase considerably.

In the present approach, because each end-user uses his or her own TCP/IP loopback connection to load pages, performance remains constant regardless of the number of global users of the personal server. Further, because each end-user uses a separate TCP/IP loopback connection, the end-user's page is unavailable only when her own computer is out of service, in which case the point is moot. Channel raw data streams are distributed over the Internet's e-mail infrastructure, eliminating the problem of a single point of failure. Further, any end-user with only an intermittent Internet connection and a modest personal computer can publish a channel with no specific expertise.

In another aspect, a method and apparatus are provided for fine-grained security control over applets restricted to a sandbox. According to one feature, a layer of control with fine granularity of security control is provided, and a method for causing an applet to be loaded from the local host is provided.

According to another feature, an applet can access network servers other than the one from which it was loaded. In another feature, applets can access local resources like other processes and local storage. In the present approach, cross-applet communication is enabled regardless of the browser.

In another aspect, embodiments provide a method and apparatus for an alternative private naming system. The present approach provides alternative naming with any browser, or any other TCP/IP application. In the present approach, no centralized server is required, which eliminates a centralized point of failure. In one feature, the present approach permits two different users to use the same name to refer to different addresses.

In another aspect, embodiments provide a method and apparatus for disclosure-free targeted online advertising. In the present approach, no disclosure of personal information of the end-user to the advertiser is required, protecting end-user privacy. In the present approach, the advertiser's decision process is distributed to end-users.

In yet another aspect, embodiments provide a method and apparatus for intercommunication between intermittently connected network nodes over e-mail infrastructure on the Internet. The present approach allows software processes running on intermittently connected nodes of a network to communicate when no connection is present. Further, the present approach uses ubiquitous e-mail infrastructure on the Internet. Thus, no additional infrastructure is necessary, and the system can be implemented with little cost. Any improvements to the e-mail infrastructure made by third parties will immediately benefit this scheme.

In still another aspect, embodiments provide a method and apparatus for clipping Web pages and embedding them in other pages. In the present approach, HTML parsing is not required, and the page to be clipped is embedded geometrically.

In other aspects, the invention encompasses a computer apparatus, a computer readable medium, and a carrier wave configured to carry out the foregoing.

BRIEF DESCRIPTION OF THE DRAWINGS

The present invention is illustrated by way of example, and not by way of limitation, in the figures of the accompanying drawings, in which like reference numerals refer to similar elements. Although the drawings are provided for purposes of illustrating example embodiments, the invention is not limited to the specific context shown in the drawings, in which:

FIG. 1D is a flow diagram of additional steps in the method of FIG. 1C.

FIG. 4A is a block diagram of a first approach to secure access to system resources.

FIG. 5B is a flow diagram of a process of using the system of FIG. 5A for carrying out enhanced security control over application programs.

FIG. 7A illustrates an example embodiment of an arrangement for providing disclosure-free targeted advertising.

FIG. 7C is a flow diagram of a second approach to delivering disclosure-free targeted advertising.

DETAILED DESCRIPTION OF THE PREFERRED EMBODIMENT

A method and apparatus for providing improved network content distribution using a personal server is described.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1A:
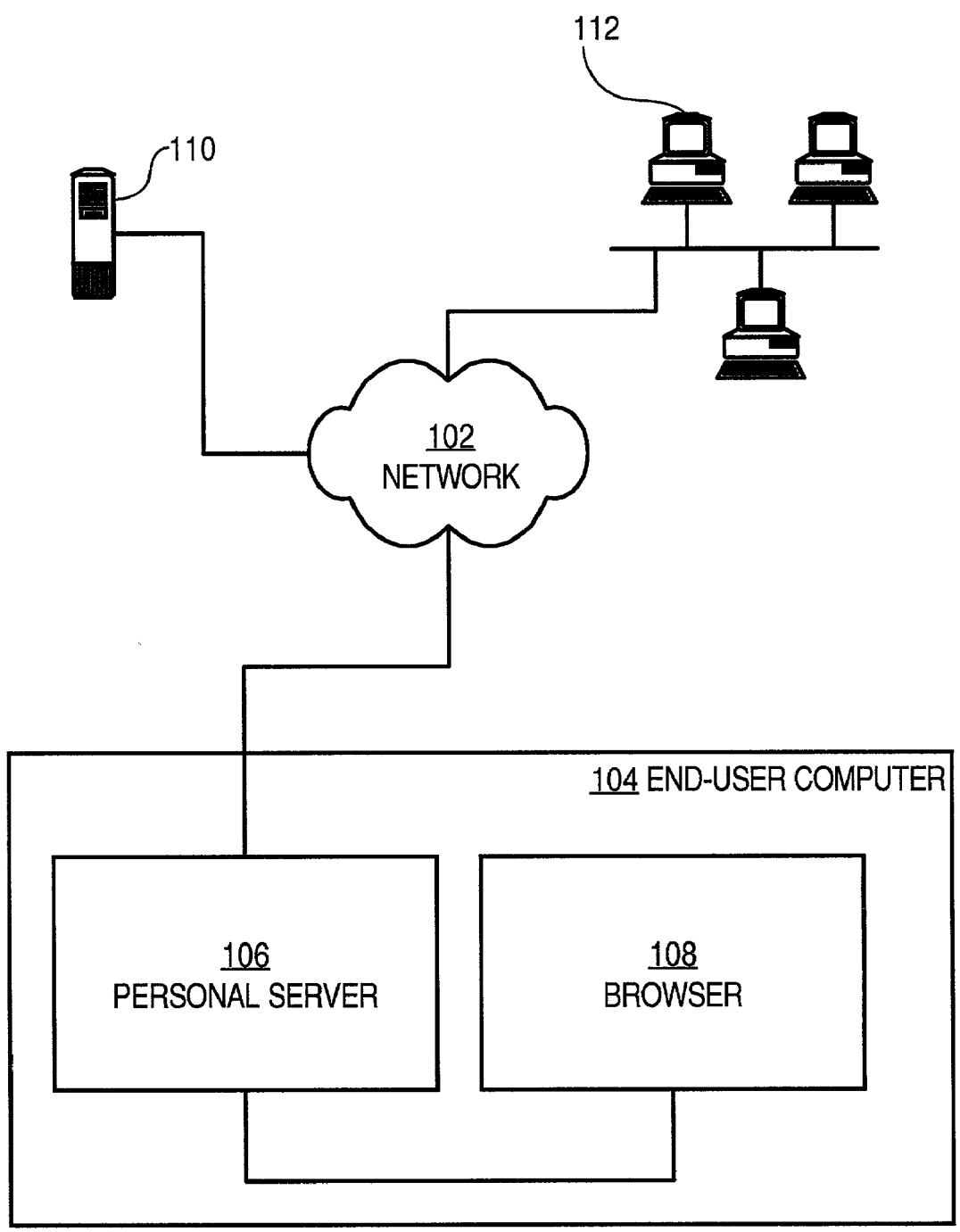
FIG. 1A is a block diagram providing a high-level view of an approach for providing improved network content distribution using a personal server.

I. Functional Overview of Providing Improved Network Content Distribution Using a Personal Server Approach FIG. 1A is a block diagram providing a high-level view of an approach for providing improved network content distribution using a personal server. In one embodiment, an end-user computer 104 is coupled to network 102. End user computer comprises a personal server 106 and a Web browser 108. The personal server 106 is communicatively coupled to the Web browser 108. Each of the personal server 106 and the Web browser 108 can communicate to other elements using network 102.

Figure 1B:
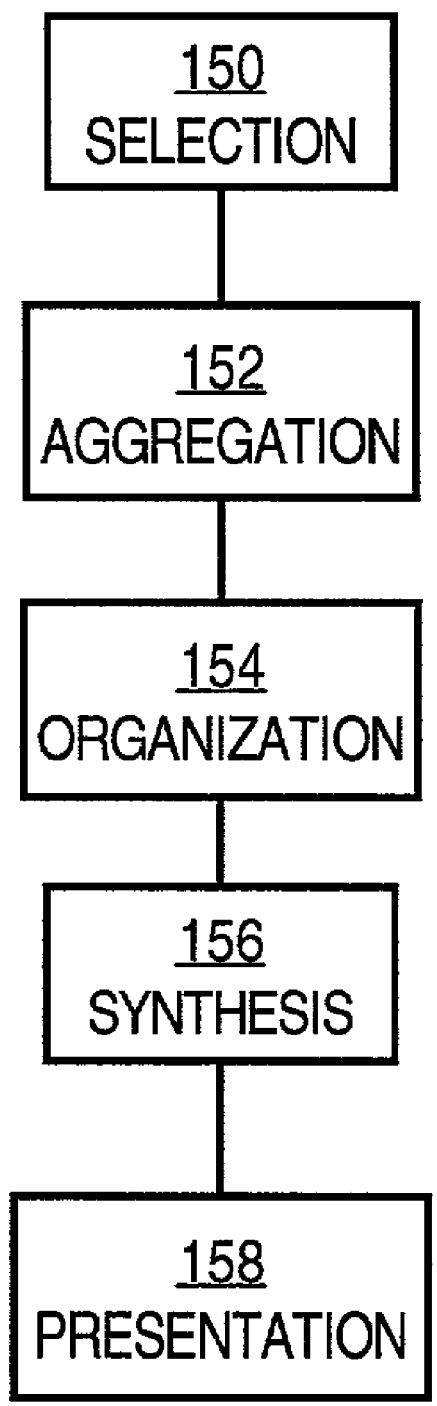
FIG. 1B is a flow diagram that illustrates one method of processing using the system of FIG. 1A.

FIG. 1B is a flow diagram that illustrates one method of processing using the system of FIG. 1A. In general, the process of FIG. 1B involves a Selection step 150, an Aggregation step 152, an Organization step 154, a Synthesis step 156, and a Presentation step 158.

In the Selection step 150, the end-user selects the content channels in which he or she is interested. The end-user interacts directly with the personal server to make selections. The selections are stored in the personal server on the end-user computer.

In the Aggregation step 152, given the list of channels selected by the end-user, the personal server fetches the latest channel content from the various content sources. This step may be performed asynchronously from end-user interaction, with the fetched content being cached at the end-user computer.

In the Organization step 154, the end-user then organizes the content into a particular spatial layout. In the present invention, the personal server allows arbitrary layout in virtual two-dimensional and three-dimensional spaces. The end-user interacts directly with the personal server to organize the content. The organization is stored in the personal server.

In the Synthesis step 156, using the content fetched from channel servers and the organization specified by the end-user, the end-user computer synthesizes an HTML document.

In the Presentation step 158, the final HTML document is then delivered from the personal server to the Web browser over the end-user computer's TCP/IP loopback interface.

Figure 1C:
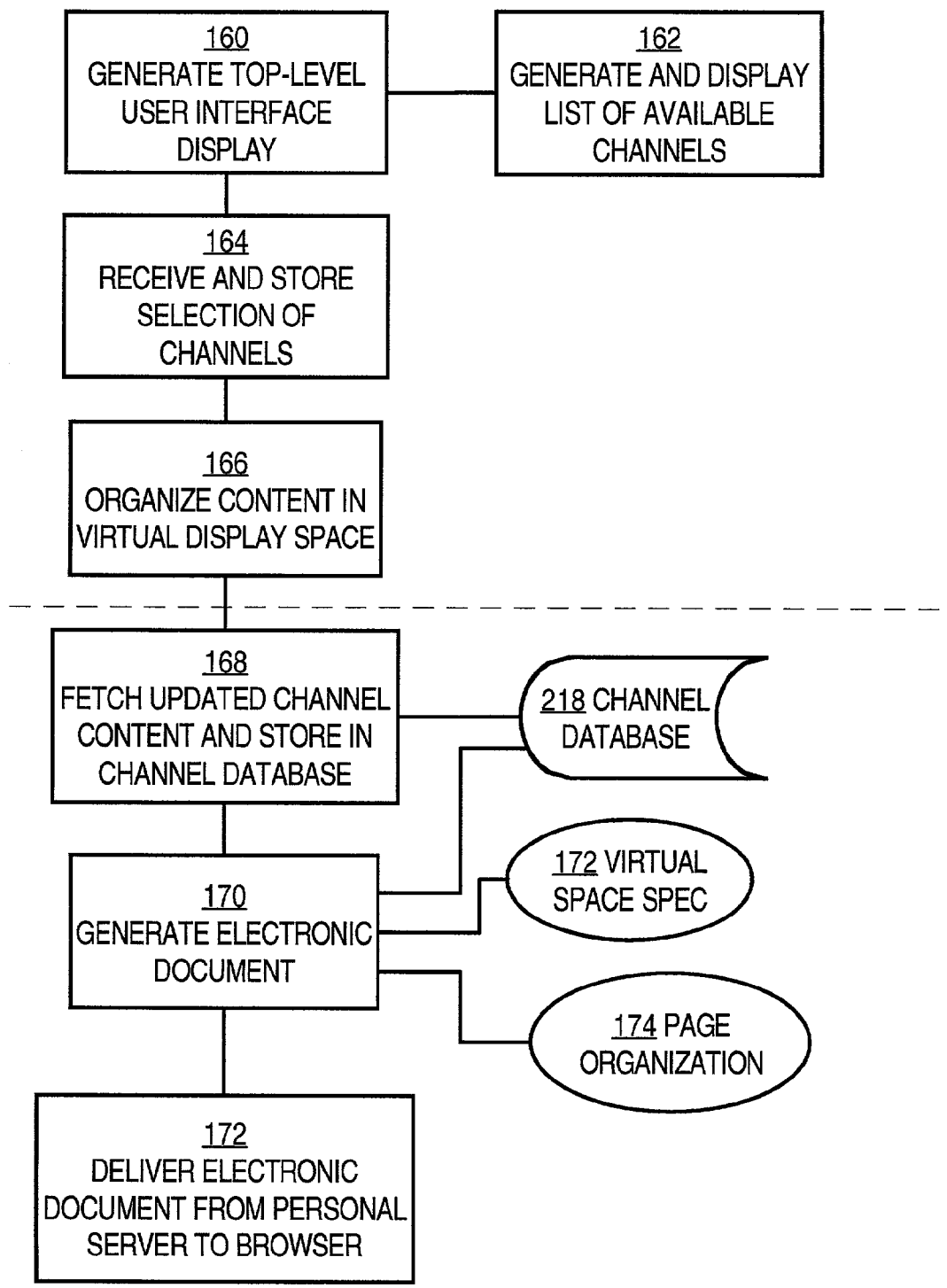
FIG. 1C is a flow diagram that illustrates a method of processing using the system of FIG. 1A.

FIG. 1C is a flow diagram that illustrates a method of processing using the system of FIG. 1A. In general, FIG. 1C represents a more detailed view of the steps of FIG. 1B, according to one more specific embodiment. FIG. 1D is a flow diagram of additional steps in the method of FIG. 1C. Further details about use of the methods of FIG. 1B, FIG. 1C, and FIG. 1D is presented in subsequent sections herein.

Referring first to FIG. 1C, block 160, block 162, block 164, and block 166 represent asynchronous steps that may be carried out at any point in time, in any order. In block 160, a top-level user interface display is generated. As indicated by block 162, generating the top-level user interface display may involve generating and displaying available channels based on issuing a query to a channel database and receiving a user-specific topology for the channels. The user-specific topology may represent a user-specific ordering or hierarchy of available channels.

In block 164, a selection of one or more content channels is received and stored at a personal server. In block 166, content or channels are organized in a virtual display space using a virtual space designer. Block 166 involves arranging a virtual display space associated with a rendering mechanism, such as a browser, in a personalized manner. For example, a user may select a particular region of the display space and dedicate it to one particular channel. The user may arrange channels in a particular order in the display space, etc.

At some point thereafter, at block 168, updated channel content is fetched from content sources associated with selected channels and stored in a channel database. Block 168 may be invoked periodically according to a pre-defined schedule that is stored and maintained by a scheduler, and can be invoked when a rendering context for a channel is updated.

Figure 1E:
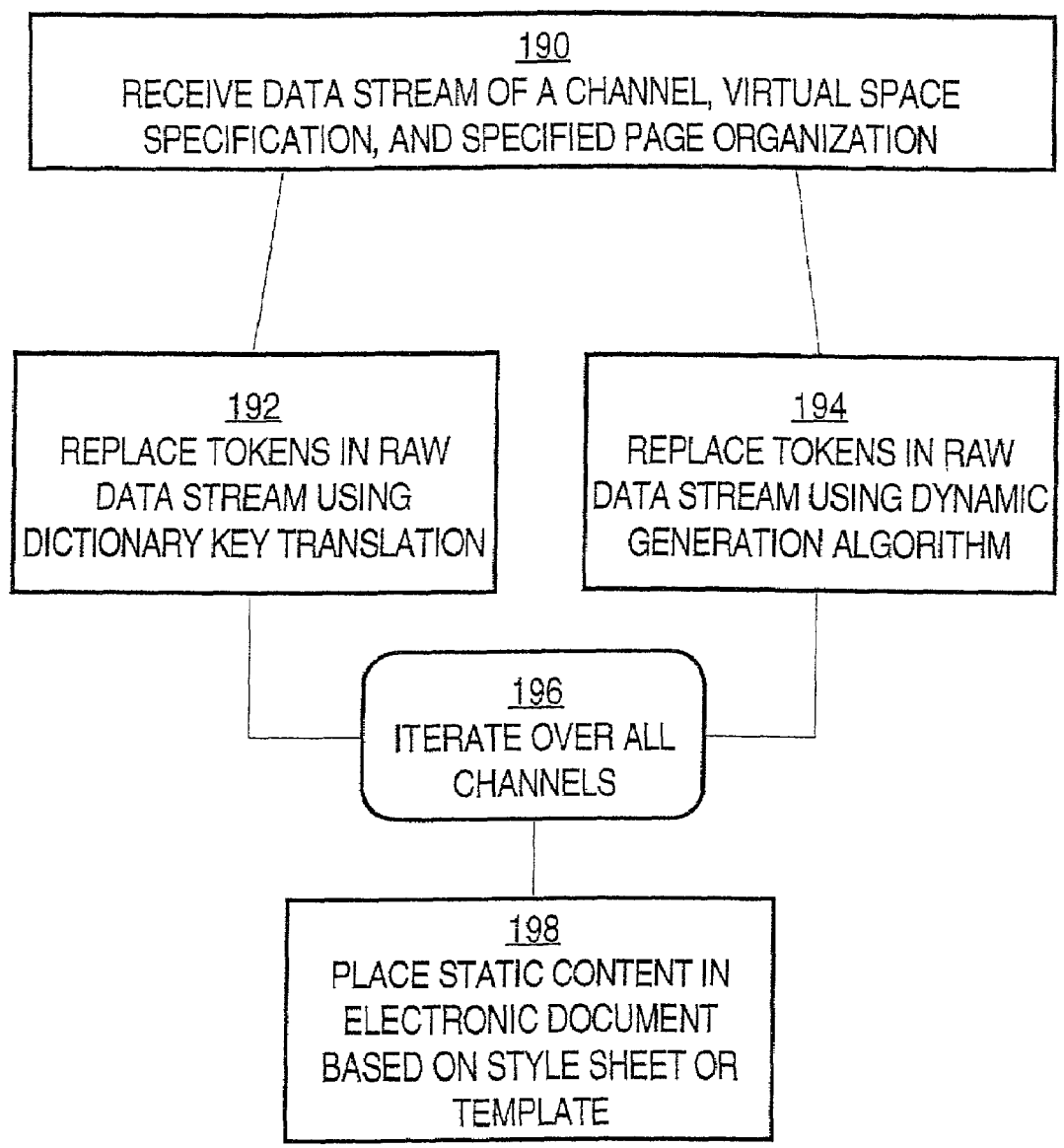
FIG. 1E is a flow diagram of additional steps in the method of FIG. 1C.

FIG. 1D and FIG. 1E present specific steps that may be used to carry out block 168. Referring now to block 180, an update specification for a channel is received. If channel is associated with a raw data stream, then the raw data stream is requested using the update method specified in the update specification, as indicated by block 182. The request may include a timestamp value of the last request that was issued, so that the content source can determine whether new content is now available. Concurrently, a new timestamp value for the current request is generated and stored. If there is no current data available at the content source, then control passes to block 184.

In block 184, a test is carried out to determine if an update was available in block 182. If update is not available, then the channel update is scheduled for later. For example, an entry is added to the scheduler that schedules the update for a future time.

In block 186, information pertaining to one or more embedded channels is received, if the current channel has a placeholder that identifies an embedded channel. The information about the embedded channels may be a channel identifier or other information that is sufficient to enable the process of FIG. 1C, FIG. 1D to execute in a recursive manner with respect to the embedded channel.

In block 188, the updated raw data stream for the current channel is rendered using a rendering context according to a configuration that the end-user has established using virtual space designer. The rendered data is stored in the channel database using an embedded Web server.

Referring now to FIG. 1E, generating an electronic document that contains channel information generally comprises receiving a raw data stream of all channels, a virtual space specification associated with the embedded Web server, and a page organization that the end-user has specified, e.g., using a Web page synthesizer. In block 192, one or more tokens in the raw data stream are replaced with other data using dictionary key translation. Alternatively, in block 194, one or more tokens in the raw data are replaced using a dynamic generation approach. As indicated by block 196, the replacement process is iterated over all data for all channels.

In block 198, one or more elements of static content are stored in the electronic document or Web page, based on a style sheet or template that the end-user has specified. The completed electronic document is then ready for delivery from the personal server to a browser using the embedded Web server.

II. Structural Overview of Personal Server

A. General Organization

Figure 2:
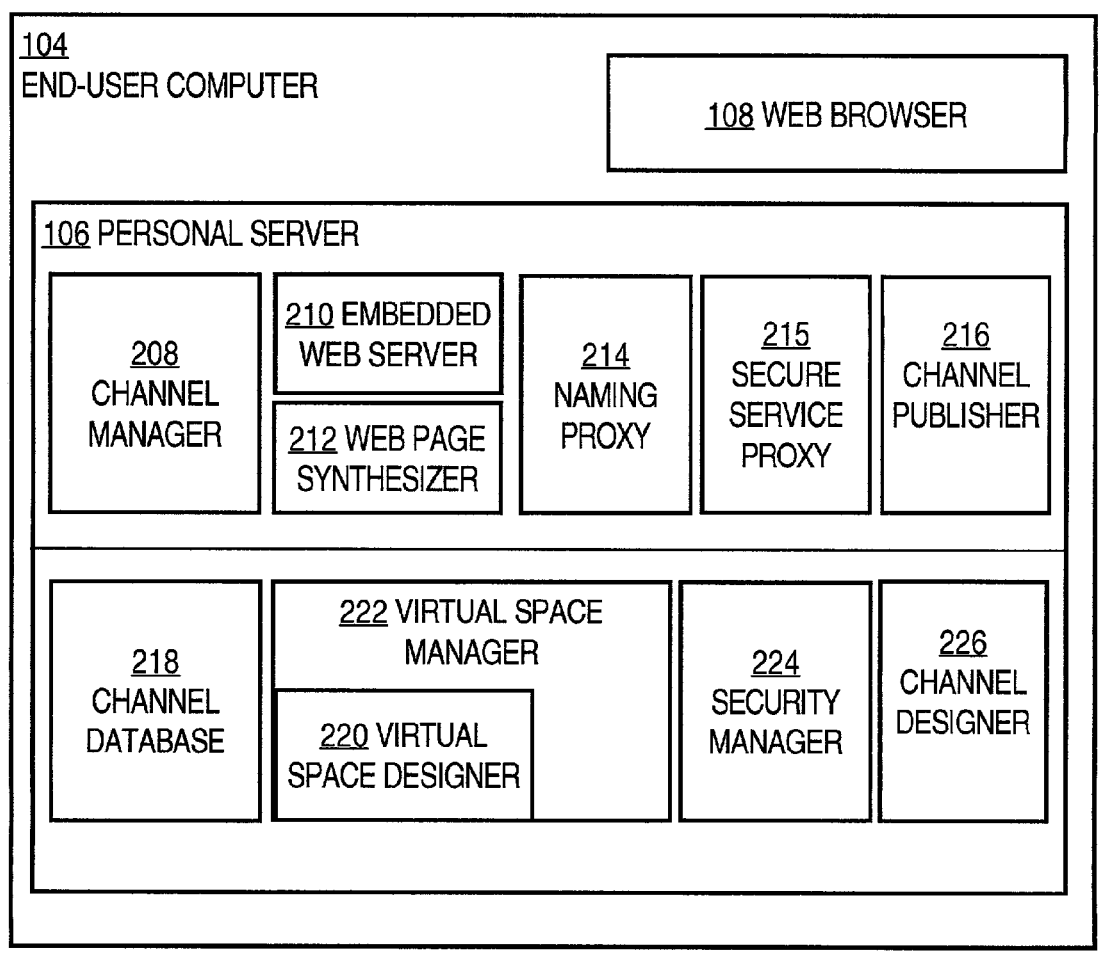
FIG. 2 is a block diagram that illustrates an overview of one embodiment of a personal server.

FIG. 2 is a block diagram that illustrates an overview of one embodiment of a personal server that may be used to carry out the processes of FIG. 1A, FIG. 1B, FIG. 1C.

In one embodiment, a personal server 106 is implemented in the form of one or more software elements that are executed using an end-user computer 104. Elements of the personal server may run as a plurality of independent processes or together as one integrated process. The components are organized in two logical groups that are termed user interfaces and back-end services.

User interfaces are components that present a sensory interface to the end-user through one or more input and output devices, e.g., keyboard, mouse, trackball, stylus, etc. User interfaces include a channel database 218, a virtual space designer 220, a virtual space manager 222, a security manager 224, and a channel designer 226.

Back-end services are components that interact primarily with other components and with other computers through programmatic interfaces. Back-end services include a channel manager 208, an embedded Web server 210, a Web page synthesizer 212, a naming proxy 214, a secure service proxy 215, and a channel publisher 216.

B. Channel Database

Channel database 218 stores information about available channels and channels that have been selected by the end-user. The end-user interacts with the channel database to select the channels in which they are interested. The methods for selecting new channels include, but are not limited to, clicking on a item in a list presented by the channel database itself, clicking on a Web page link through a Web browser, and dragging and dropping a link from a Web browser to the channel database interface. The database maintains a persistent store containing all of the channels the end-user has selected. It permits the end-user to organize the channels into arbitrary hierarchical groupings.

C. Channels, Rendering Contexts

In this context and throughout the approach described herein, a channel comprises a raw data stream and a rendering context. The raw data stream is data that is fetched from a fixed or known location. The location may be specified with a Uniform Resource Locator (URL) or a reference to an e-mail account, as described herein with reference to the channel manager 208. Making a request to the data stream URL will fetch the latest data in the stream. The data may include but is not limited to text, graphics, video, and audio in various electronic formats.

The rendering context specifies how the raw data stream is visually rendered in the end-user's Web browser. A rendering context can be null, or can be manifested in the form of a style sheet, template, script, helper reference, or applet.

When the rendering context is Null, the raw data is already in a format suitable for display by the end-user Web browser and therefore no specific rendering context is needed. An example of such raw data is HTML data or a graphics image in a format the Web browser can render such as GIF, JPG, or PNG.

When the rendering context is a style sheet, it is applied by the Web browser to the data stream, which will typically be HTML. An example of a style sheet is a Cascading Style Sheet (CSS) document. When the rendering context is a template, it is combined with raw data stream by a processor embedded in the personal server to produce a result that is suitable for display by the Web browser. For example, the template is an XSL (Extensible Stylesheet Language) file, the raw data is XML, and the processor embedded in the personal server is an XML parser.

The rendering context also may comprise a script, for example, code in a scripting or programming language, which is to be interpreted and executed by a processor/interpreter embedded in the personal server. This processor/interpreter may provide to the executing code a script data previously gathered from local sources such as the user or information in local storage, or from remote sources across a network connection. When the rendering context is a script, the raw data may be input to be made available to the executing code, or may be additional code to be inserted or appended to the rendering context code before it is executed or while it is executing. The expected output from the execution is in a format suitable for display by the Web browser. For example, the script is Perl code, and the raw data is input, and the embedded processor is a Perl interpreter.

The rendering context may be a reference to a program already installed on the end-user computer but is not embedded in the personal server. The program is executed with the raw data as input. The results are displayed in the Web browser. For example, the reference is the path to an MPEG (Moving Pictures Experts Group) video player application, which is started in the Web browser with the raw data being the video file to be played.

The rendering context also may be a mini-application known as an applet that can be directly displayed by the Web browser. The raw data is input to the applet, which generates rendered information to the browser in programmatic fashion. An example is an applet written in the Java programming language.

In one embodiment, the rendering context includes a specification of when the raw data stream should be updated. Example specifications include on-demand by the end-user, or at regular or irregular finite time intervals.

The rendering context and the raw data stream are independently updateable. Thus, once the end-user has added a channel to the channel database, the raw data stream may be updated repeatedly using the same rendering context. Conversely, the rendering context may be upgraded to a new version with different or additional capabilities but continue to operate on the same data stream. When the rendering context is upgraded, it replaces the existing rendering context in the database.

A channel may have a rendering context and no raw data stream. Instead, it can include one or more placeholders where other channels may be embedded. This allows the embedded ("child") channels to inherit rendering rules and specifications from the parent channel's rendering context, giving all the children a uniform and consistent appearance. Further, groups of channels may moved together when the end-user is arranging them in a virtual space, as described herein with reference to the virtual space designer. Channels that can contain other channels are referred to herein as meta-channels.

D. Channel Manager

Channel manager 208 is a process that runs asynchronously from end-user input or activity and is responsible for updating the raw data stream and rendering context of each channel in the channel database.

The channel manager 208 examines the update specification included in each channel and fetches updated raw data from the specified URL or e-mail account in the channel at the appropriate time. If, at the appointed time, an update is not possible, the update is rescheduled and deferred until a later time when the update may be re-attempted. For example, an update may be impossible because the end-user computer is not currently connected to the network 102. In this case, the updates are deferred until the next time the end-user computer is connected to the network. Another reason may be that the server that provides the channel's raw data stream is unavailable. In this case, the channel manager schedules a retry at a later time.

Fetching new data may be carried out using a URL or email. The resources to which the channel's publisher has access determines which method is used. Using a URL to fetch new data is appropriate for channel publishers who can serve channel raw data from a server computer that has either a static IP address or a permanent DNS name or both. The publisher configures and maintains server software such as a Web server. The URL specifies a location on that server from which the latest raw data may be fetched. How it is fetched is indicated by the protocol given in the URL.

Email fetching is appropriate for channel publishers who do not have access to a server computer with a static IP address or DNS name, or does not want to or is not capable of configuring and maintaining server software such as a Web server. Instead, the raw data is fetched from an email account through POP, IMAP, or WebDAV-based protocols. Raw data is stored in the email message body, and a special mail header extension is used to denote that the message body is channel data and not intended to be human-readable. The email account used for data delivery can either be dedicated to channel data, or it may be shared with regular person-to-person e-mail. If the account is shared with regular email, the channel manager must regularly access the account to fetch and delete emails that are denoted as channel data so they are not visible to the human reader of the account.

When the channel manager 208 receives new raw data for a channel, the channel manager stores the new raw data in the channel database, in association with a timestamp value that indicates the time at which the channel was last updated. On subsequent requests to the server, the channel manager sends the timestamp value. The server, after examining the timestamp value, may reply with a message indicating there is no data newer than the timestamp value, or may reply with the new data if there is any.

An update specification value is included in the channel when it is selected by the end-user and added to the channel database 218. The end-user may choose to change the update specification of any channel in the channel database 218. For example, they may choose to make updates more or less frequent. The publisher of the channel may also include rules that supersede any end-user changes. Such rules may prevent the end-user from making any changes, or may restrict the changes to a certain range or set of values.

The channel manager 208 also updates the rendering context of the channel. While raw data stream updates are made based on the URL embedded in the channel, rendering context updates are carried out using the server from which the channel was downloaded initially. Rendering context updates generally are performed with much less frequency than raw data, because updates represent new or different functionality.

Each channel has a visual representation in two or three-dimensional space after it has been fully processed by the personal server and the Web browser. The virtual space designer 220 is a graphical user interface that allows the end-user to arrange and lay out the channels collected in the channel database into a two or three-dimensional virtual space. For example, when the end-user adds a channel to a virtual space, the channel may be graphically represented on the screen display of end-user computer 104 as a rectangle, either flat or volumetric. The initial dimensions of the rectangle are specified in the channel's rendering context. The channel rectangle may be moved about the virtual space arbitrarily and resized by the end-user.

If a meta-channel has been added to the virtual space, the end-user may add other channels, including other meta-channels, to it. When the parent meta-channel is moved in the virtual space, the absolute positions of the child channels contained therein are automatically changed to maintain their relative position to the parent meta-channel.

The end-user may attach a style sheet to the virtual space. The style sheet provides a rendering context for the entire virtual space. The style sheet specifies rules for the visual display of the contents of the virtual space. Such rules may specify, among other characteristics, color, typography, size, behavior of interactive elements, and positioning of decorative and background elements. The foregoing characteristics are provided as examples, and embodiments are not limited to rules that specify any particular characteristics. For any given channel in the virtual space, the rules of the associated rendering context are first applied to the raw data. A rendering context may leave any particular display attribute unspecified. For unspecified attributes, the raw data will inherit the attributes from the meta-channel that contains it. If there is no containing meta-channel, attributes are inherited from the style sheet of the virtual space. If the style sheet still does not specify a particular attribute, the default attributes of the Web browser that will ultimately display it are used.

Using the virtual space manager 222, the end-user may save the virtual space, its style sheet, and all of the channels added to it and their placements and sizes to a persistent storage medium. With virtual space manager 222, the end-user may create and save and organize an arbitrary number of virtual spaces. Each virtual space must be assigned a unique name. One virtual space may be specially designated as the default virtual space.

E. Embedded Web Server

Embedded Web server 210 facilitates display of fully rendered virtual spaces on end user computer 104. For example, after creating one or more virtual spaces, the end-user may view the fully rendered virtual spaces in a Web-browser 108 on the end-user computer.

To view the default virtual space, the end-user specifies the URL http://localhost in her Web browser. By convention, in most TCP/IP implementations, localhost is the hostname assigned to address 127.0.0.1, which refers to the computer on which the request is made. Alternatively, any name that translates to 127.0.0.1, either by external DNS lookup or by local mechanisms like a hosts file, may be used. Furthermore, in most TCP/IP implementations, any address in the address block 127.x.y.z, where x, y, and z are integers ranging from 0 to 255, refer to the computer on which the request is made. Therefore, any name which translates to an address in this block may be used. When a Web browser connects to 127.0.0.1, the TCP/IP stack on the end-user computer will route the connection through a loopback interface to a port on the same end-user computer.

In the normal mode of operation, the embedded Web server 210 of the personal server 106 running on the end-user computer 104 binds to TCP/IP port 80 and enters a listening mode. A request to http://localhost issued to Web browser 108 by the end-user connects the Web browser through the loopback interface to the embedded Web server 210. In an alternative mode of operation, the embedded Web server 210 may bind to a different port. In this case, the end-user specifies the port number in the URL. For example, the end-user may enter a URL in the form "http://localhost:n", where "n" is the port number.

The embedded Web server 210 responds to the Web browser's HTTP request over the loopback connection. The embedded Web server 210 first performs security verification. It examines the IP address of the system making the HTTP request. If the IP address is not 127.0.0.1, then it rejects the request and returns a document containing an error message. The end-user may amend the security verification process with additional security verification rules. For example, the end-user may choose to allow access by a finite set of IP addresses, or to disable security verification altogether and allow access by any IP address. Additionally, the end-user may apply restrictions on a per-virtual space basis. That is, certain IP addresses may be allowed access to one virtual space but not another.

After the security verification step is complete, the embedded Web server 210 requests the Web page synthesizer 212 to load a virtual space and fully render it into a Web document suitable for display in Web browser 108. The page synthesis process is described in the next section. When synthesis is complete, Web page synthesizer 212 returns the fully rendered document to the embedded Web server, which then serves the document back to the Web browser over the TCP/IP loopback connection.

Given the default URL of http://localhost, the embedded Web server 210 asks the Web page synthesizer 212 to load the default virtual space. To load one of the other virtual spaces stored by the end-user in the virtual space manager 222, the end-user appends an identifier for the desired virtual space to the URL. For example, a virtual space named "Edwards-Space" would be loaded using the URL "http://localhost/Edwards-Space".

Alternatively, the embedded Web server 210 may be implemented as a proxy server that binds to an arbitrary port. In this implementation, the embedded Web server 210 responds as described above to all requests for http://localhost, or another hostname selected by the end-user. Requests to all other URLs are passed through to the target hosts and handled by proxy. To use this alternative implementation, the TCP/IP stack of the operating system of end-user computer 104 is re-configured to use the proxy server. The embedded Web server 210 proxy server may be required to support all of the protocols used by the end-user, and not just HTTP.

In still another alternative, the user may access the embedded Web server 210 using a non-standard URL protocol. For example, an "ews" protocol is defined such that the user would enter the URL "ews://localhost" into Web browser 108. The underlying operating system is required to support the registration of custom non-standard protocol handlers. The embedded Web server 210 is registered to handle URLs using the ews:// protocol.

F. Web Page Synthesizer

Web page synthesizer 212 facilitates generation of Web pages from raw data. After loading the virtual space specified by the embedded Web server 210, the Web page synthesizer 212 examines the raw data associated with all of the channels added to the virtual space. The raw data may contain tokens in the form of strings of data that are delimited by special markers. Such tokens are generally found in raw data that is text, although tokens may be found in any raw data.

Tokens found in the raw data by the synthesizer are replaced other data using one of two approaches. In a first approach, a token is associated with an algorithm that dynamically generates new raw data that replaces the token. For example, a dynamic generation algorithm determines the current date and time, and generates a string representing the current date and time. In a second approach, a token is a key into a dictionary that translates tokens into static strings of raw data. The translations are defined by the end-user.

The replacement data for a token may itself contain other tokens. The Web page synthesizer 212 iterates over all raw data until all tokens are replaced, using a cycle-detection approach to avoid entering an infinite loop.

The Web page synthesizer 212 then iterates over the channels in the virtual space and processes the raw data of each channel based on the rendering context of the channel. Any rendering attributes not specified by a rendering context of a channel are inherited from the parent channel and applied. If there is no parent channel, the missing attributes are inherited from the style sheet attached to the virtual space. Any remaining unspecified attributes after this stage are provided when the Web browser 108 later displays the document.

Next the Web page synthesizer 212 places in the document any static, fixed elements specified by the style sheet. Then it places the rendered channels in the document at the positions specified by the end-user in the virtual space designer 220.

Finally, the synthesized document is passed back to the embedded Web server 210.

G. Naming Proxy

Naming proxy 214 facilitates creating and resolving arbitrary mappings of names to IP addresses. By convention, in most TCP/IP implementations, the hostname "localhost" translates to the IP address 127.0.0.1, or another address in the block 127.x.y.z which refers to the same host as on which the TCP/IP connection originates. Other names are resolved to IP addresses using the Domain Name System (DNS).

According to one embodiment, naming proxy 214 provides a method and apparatus to allow end-users to create arbitrary mappings of names to IP addresses without relying exclusively on conventional DNS resolution and without confining the end-user to use of "localhost" as the originating hostname. In the context of the personal server 106, naming proxy 214 permits the Web browser 108 to connect to the embedded Web server 210 using a name other than "localhost". More general applications of the naming proxy are discuss below.

Figure 3A:
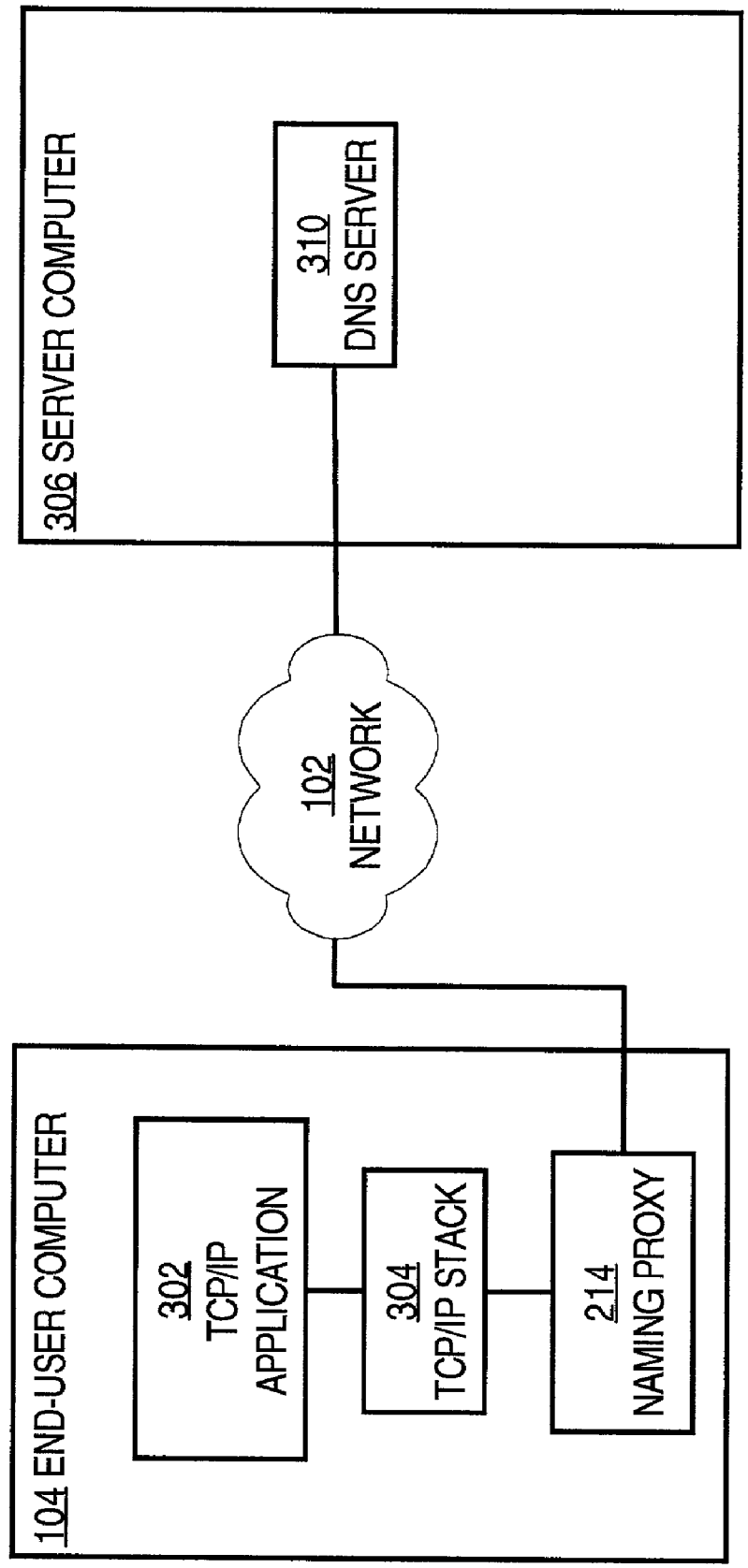
FIG. 3A is a block diagram of a naming proxy in the context of other computing elements.

FIG. 3A is a block diagram of a naming proxy in the context of other computing elements. Naming proxy 214 of end-user computer 104 interacts with a TCP/IP stack 304, which typically forms a part of an operating system that controls applications running on the end-user computer. Such applications may include a TCP/IP application 302, such as a Web browser, that communicates with TCP/IP stack 304 and receives services from it. Naming proxy is communicatively coupled to network 102. A server computer containing a DNS server 310 is communicatively coupled to network 102. In other approaches, the DNS server 310 may be hosted by end-user computer 104; this approach may be carried out, for example, where the end-user computer 104 is a high-end workstation or server.

Figure 3B:
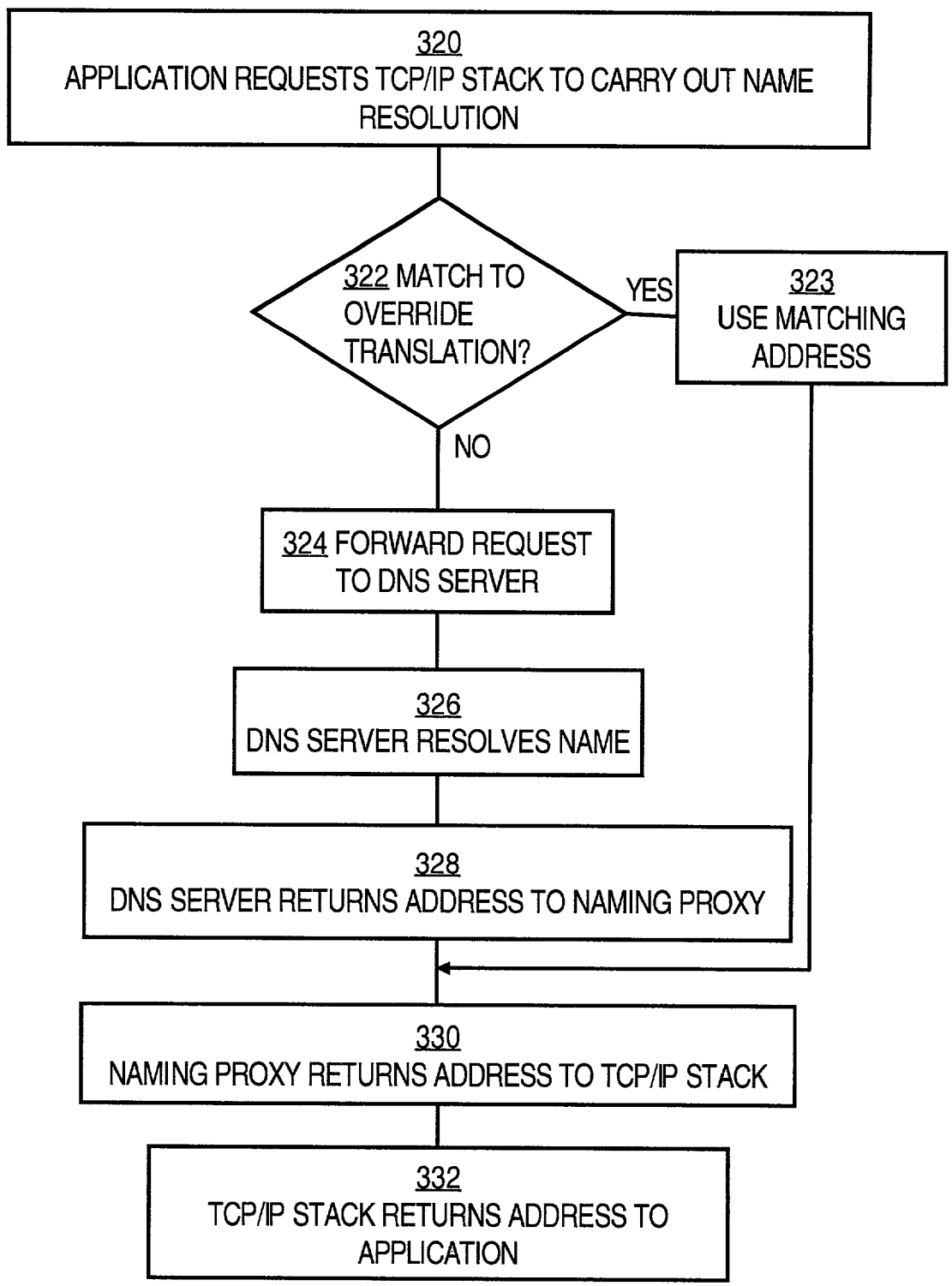
FIG. 3B is a flow diagram of one embodiment of a method of using a naming proxy to carry out name resolution.

FIG. 3B is a flow diagram of one embodiment of a method of using a naming proxy to carry out name resolution. For purposes of illustrating an example, the process of FIG. 3B is described in the context of FIG. 3A. However, embodiments of the invention are not limited to this specific context.

In block 320, an application requests the TCP/IP stack to carry out name resolution for a particular symbolic name. For example, TCP/IP application 302, or a Web browser 306, requests TCP/IP stack 304 to resolve a URL containing a hostname. It is assumed that at a previous time, the TCP/IP stack 304 has been configured such that the preferred DNS server is set to 127.0.0.1, i.e., the local host. Therefore, the DNS resolution request is made over a loopback connection to the naming proxy 214 that is running on the end-user computer 102. The naming proxy 214 is bound to port "53," which is the conventional TCP/IP port for DNS service. If the operating system of end-user computer 102 uses a different port number for DNS service, then naming proxy 214 is bound to that port instead.

Further, it is assumed that at a previous time, the end-user configured the naming proxy 214 with one or more override translation values. Thus, in block 322, the name for resolution is tested against the override translation values to determine if a match exists. If the hostname to be translated matches one of the override translations, it is used for resolution, as indicated in block 323.

If there is no match to an override translation value, then control passes to block 324, in which the naming proxy forwards the resolution request. In one embodiment, the request is forwarded to the original DNS server the TCP/IP stack was configured to use before it was changed to 127.0.0.1.

In block 326, the DNS server resolves the name. In block 328, the DNS server returns the resulting address to the naming proxy 214.

In block 330, the naming proxy 214 returns the result, whether from a translation in the proxy or from the DNS system, to the TCP/IP stack. In block 332, the translation is returned to the TCP/IP application from the TCP/IP stack.

Using this process and structure, the end-user can use the naming proxy to assign any number of arbitrary names to the address 127.0.0.1. Also, the naming proxy is also useful outside the context of the personal server as a stand-alone process. In such a role, the naming proxy allows end-users to assign arbitrary names to any IP address. With such a capability, end-users can create fictional domains, mask real domains, and create shortcut names.

For example, the DNS system defines a fixed set of Top Level Domains (TLD) such as .com, .net, and org. The naming proxy allows end-users to create and access from their end-user computer domains and hostnames that do not actually exist in DNS. Further, the naming proxy can override real DNS domains and hostnames by returning IP addresses specified in translations on the proxy instead of obtaining the DNS translations. This could be used, for example, to restrict access to particular sites with inappropriate content. In addition, a user may have a favorite news site that has an extremely long or complicated URL. The naming proxy can be used to map a short name to the true IP address of that site.

In each of these approaches, the DNS is circumvented in a way that may benefit the end-user, but does not require changes to the DNS system itself, or interfere with the proper use of DNS by other end-users or other computers on the Internet.

In an alternative approach, the naming proxy is implemented as a protocol-level proxy server that binds to an arbitrary port. In this implementation, the naming proxy intercepts all requests configured to pass through it. If the hostname specified in the request matches one of the names that is configured to be fictional, masked, or a shortcut, as described above, the naming proxy responds to the request itself. All other requests are passed through and handled by proxy.

In this approach, the TCP/IP stack of the end-user computer operating system is reconfigured to use the proxy server. The proxy server is required to support all of the protocols used by the end-user, and not just HTTP.

H. Secure Service Proxy

Secure service proxy 215 facilitates providing applications with more expansive yet secure access to system resources. As described herein in the Background section, a security concern associated with applets is that an applet received from an untrusted server may attempt to cause the client computer to carry out unauthorized operations. Accordingly, most Web browsers execute applets within a confined security domain or "sandbox" that restricts the resources that an applet can use. Web browsers sometimes allow the security restrictions or boundaries of the sandbox to be configured by the operator, but with quite coarse granularity. Secure service proxy 215 provides a mechanism for enabling more fine-grained control of security access for an applet that is subject to sandbox control by a Web browser.

The description herein assumes that the applet is served to the Web browser from a Web server running on the local host, the same end-user computer the Web browser is running on. This requirement may be addressed using two different approaches.

FIG. 4A is a block diagram of a first approach. In the approach of FIG. 4A, end-user computer 104 executes a Web browser 108 and an embedded Web server 210, which is communicatively coupled to network 102. Server computer 306 executes a Web server 402 that is communicatively coupled to network 102. In this arrangement, the Web server 210 of the end-user computer 104, or a process cooperating with the Web server 210, downloads the desired applet from its server of origin, e.g., server computer 306. The end-user then enters an appropriate URL into the Web browser 108, which then loads the applet from the local Web server 210.

This approach assumes that either the end-user or the Web server 210 can specifically isolate the desired applet on the remote server computer 306. However, applets are often embedded inside Web pages, and the end-user may not have the desire or the know-how to separate the applet from its Web page.

Figure 4B:
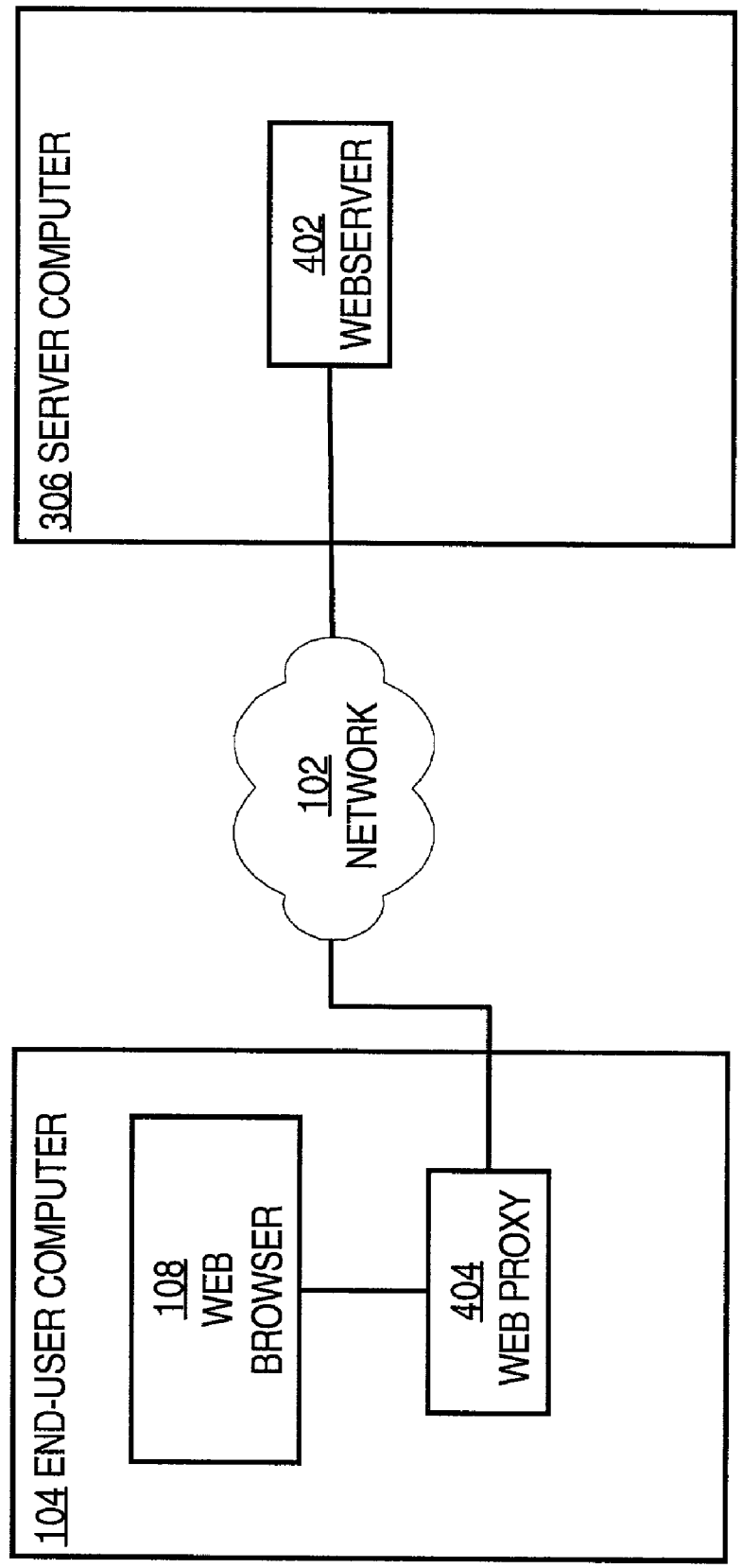
FIG. 4B is a block diagram of a second approach to secure access to system resources.

FIG. 4B is a block diagram of a second approach. In the approach of FIG. 4B, end-user computer 104 executes a Web browser 108 and a Web proxy 404, which is communicatively coupled to network 102. Server computer 306 executes Web server 402 that is communicatively coupled to network 102.

In this arrangement, the end-user enters into the Web browser 108 a URL of a remote Web page with the embedded applet. The browser is configured to use the Web proxy 404. Accordingly, Web browser 108 requests the Web proxy 404 to provide the URL.

In response, the Web proxy 404 connects to the remote server computer 306, and loads the desired Web page from Web server 402. Server computer 306 serves the requested Web page to the Web proxy 404. The Web proxy 404 parses the Web page to find any URLs that refer to embedded applets. The Web proxy 404 loads any such applets from the remote server computer 306 and caches the applets locally at end-user computer 104.

Web proxy 404 then modifies the HTML code of the Web page that it retrieved, so that each URL in the Web page refers to the end-user computer 104 instead of the remote server computer 306. The modified Web page is returned to the Web browser 108. The Web browser 108 parses the Web page and makes requests to the local host for the embedded applets.

Figure 5A:
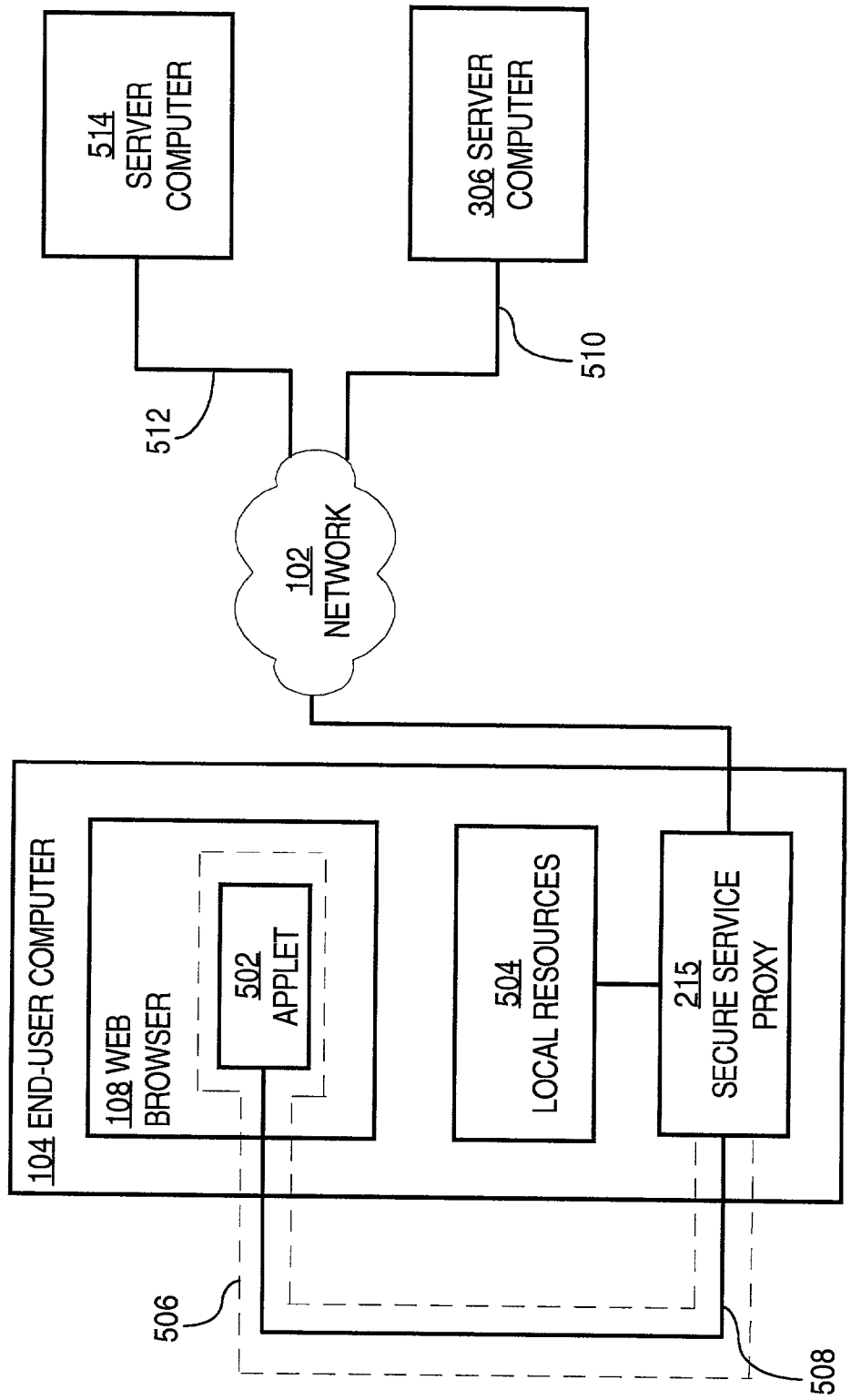
FIG. 5A is a block diagram of a system providing enhanced security control over application programs.

FIG. 5A is a block diagram of a system providing enhanced security control over applet programs.

An end-user computer 104 executes a Web browser 108. An application program such as applet 502 is executed within the browser. Applet 502 is communicatively coupled by network connection 508 to secure service proxy 215. The connection of the applet 502 to the secure service proxy 515 is subject to security controls such that the applet may access only resources located within logical sandbox 506.

Secure service proxy 215 has access to one or more local resources 504. The secure service proxy 215 also may establish network connections 510, 512 to server computer 306, server computer 514, or other network elements.

FIG. 5B is a flow diagram of a process of using the system of FIG. 5A for carrying out enhanced security control over application programs.

In block 520, one or more of the applets begin executing. For example, applet 502 is received at end-user computer 102 over a network connection, temporarily stored at the end-user computer, loaded into memory from such temporary storage, and executes in the end-user computer under control of browser 206. Since the applet has been loaded from the local host, sandbox controls permit each applet to have network access only to the local host, as indicated by block 522. For example, where the applet is a Java® program, such sandbox controls form an inherent part of the Java Virtual Machine that executes as part of the browser to control and manage execution of the applet. Meanwhile, concurrently or before execution of the applet, the secure service proxy is configured with one or more access restrictions, as indicated by block 524.

At some later point after the foregoing preparatory stages, in the context of the personal server, the secure service proxy operates to permit applets serving as rendering contexts to access local and remote security domains. In one example implementation, as indicated by block 530, the secure service proxy, which may be a component of the personal server or a standalone process, binds to a designated port number and listens for incoming connections from applets. In block 532, an applet requests access to a resource that is located in a local or remote security domain that is outside the sandbox. In block 534, the secure service proxy facilitates access by the applet to the local or remote security domain.

Applets that use this approach are configured to communicate with the secure service proxy. An applet may directly include code for this, or it may be linked with a library that encapsulates such functionality. For example, communication of an applet to the secure service proxy may involve making a Remote Procedure Call (RPC) over the loopback connection to the secure service proxy on the local host.

Because the secure service proxy is a native process running on the operating system on the end-user computer, the sandbox controls do not restrict its operation. Once the applet connects to the secure service proxy, the secure service proxy may provide the applet with access to any of the services provided by the operating system on the end-user computer. The end-user can then restrict the access that the secure service proxy permits applets with as much granularity as allowed by the operating system, by carrying out appropriate configuration at block 524.

The secure service proxy may restrict applet access in any suitable manner. For example, the secure service proxy may maintain a database of access control lists (ACL), one for each distinct applet. The access control lists specify restrictions on access to security domains. For example, an ACL may allow an applet access to local disk, but limit the total amount of disk space usable by an applet, thereby creating a small virtual disk to which the applet has access. An ACL may also allow and restrict network access to certain IP address ranges or DNS domains, and may also restrict the bandwidth allowed to each applet.

I. Security Manager

Security manager 224 is a user interface that an end-user may use to configure the properties and settings of the naming proxy 214 and the secure service proxy 215. The types of configuration possible for each of these two components are specified in their respective descriptions herein. In an alternative approach, naming proxy 214 and secure service proxy 215 each have an integrated user interface element, and a separate security manager 224 is not required.

J. Channel Designer

Channel designer 226 may be a sub component of the personal server 106, as shown in FIG. 2, or it may be a stand-alone process. When a third party channel publisher organization has access to server computer resources from which the channel can be served, then channel designer 226 may be used stand-alone. When a channel publisher organization is an end-user without access to such resources, the channel designer 226 is used as part of the personal server 106 together with channel publisher 216.

Channel designer 226 provides a user interface that allows a channel publisher organization to design a channel for publication. The publisher organization specifies attributes of the rendering context and a method and location or means to fetch new raw data for the channel. The channel designer 226 also allows the publisher organization to update the channel with new raw data. After channel design is complete, the channel designer 226 packages it and generates HTML code that the publisher organization may distribute in order for the channel to be added by other end-users to their channel databases. This code may be embedded in a Web page or in an email, among other methods.

K. Channel Publisher

Channel publisher 216 facilitates publishing content on one or more channels. In one embodiment, the components of a channel are formatted and delivered according to standard markup formats or electronic document formats such as HTML, XML, XSL, and Javascript. Therefore, a channel may be served from existing server resources over standard protocols such as HTTP and FTP. When a channel publisher organization has access to server computer resources from which the channel can be served, then use of a channel publisher 216 is not necessary, although it may still be used stand-alone or in conjunction with the channel designer 226. Channel publisher 216 is primarily intended for end-users who are using the personal server 106 both as means for receiving channels and a means for publishing channels. In this environment, channel publisher 216 substitutes or compensates for a lack of appropriate server computer resources of such end-users.

Channel publishing may proceed in a plurality of ways when the publisher does not have direct access to such resources, as illustrated in FIG. 6A, FIG. 6B, FIG. 6C, FIG. 6D.

Figure 6A:
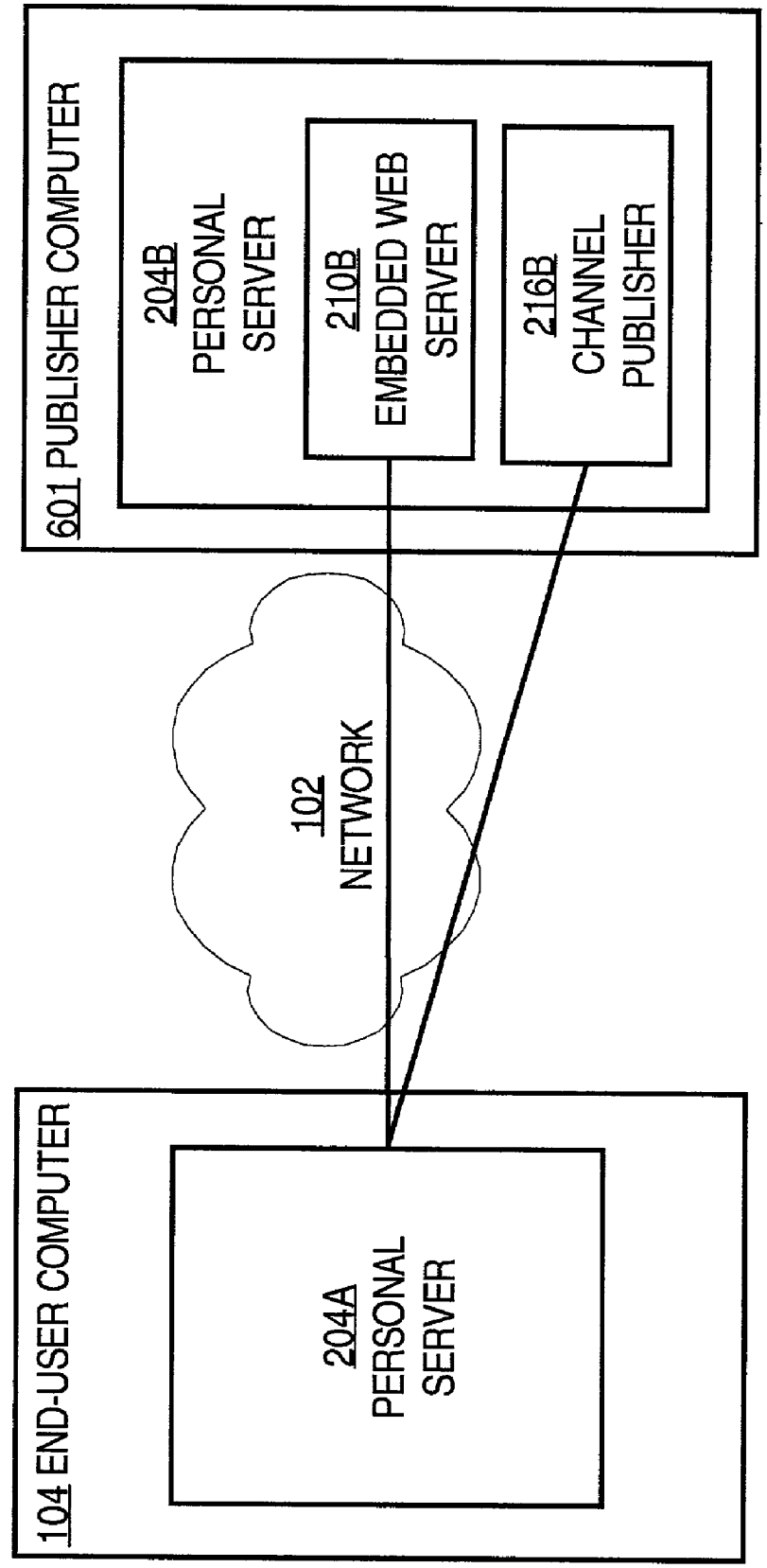
FIG. 6A is a block diagram showing a structural arrangement and communication paths followed in a Direct Serve approach.

FIG. 6A is a block diagram showing a structural arrangement and communication paths followed in a Direct Serve approach. The Direct Serve approach is favored for publishers whose end-user computer has a permanent connection to the network, such that it will be constantly available to channel subscribers, and it has either a static IP address or DNS name, such that a fixed location may be embedded in the channel for distribution.

End user computer 104 executes a personal server 204A of the type described herein with reference to FIG. 2. Personal server 204A is communicatively coupled directly or indirectly through one or more networks, such as network 102, to embedded Web server 210B and channel publisher 216B, which execute as part of personal server 204B at a publisher computer 601. In operation, the channel publisher 216B makes a raw data stream of content available to end-user computer 202 over a standard protocol like HTTP. It can either do so through the embedded Web server 210A, or independently on a TCP/IP port. Other end-user personal servers 204A fetch new raw data directly from this component. The channel publisher 216B distributes the channel using as the location of the raw data stream a URL to the channel publisher on his or her computer.

Figure 6B:
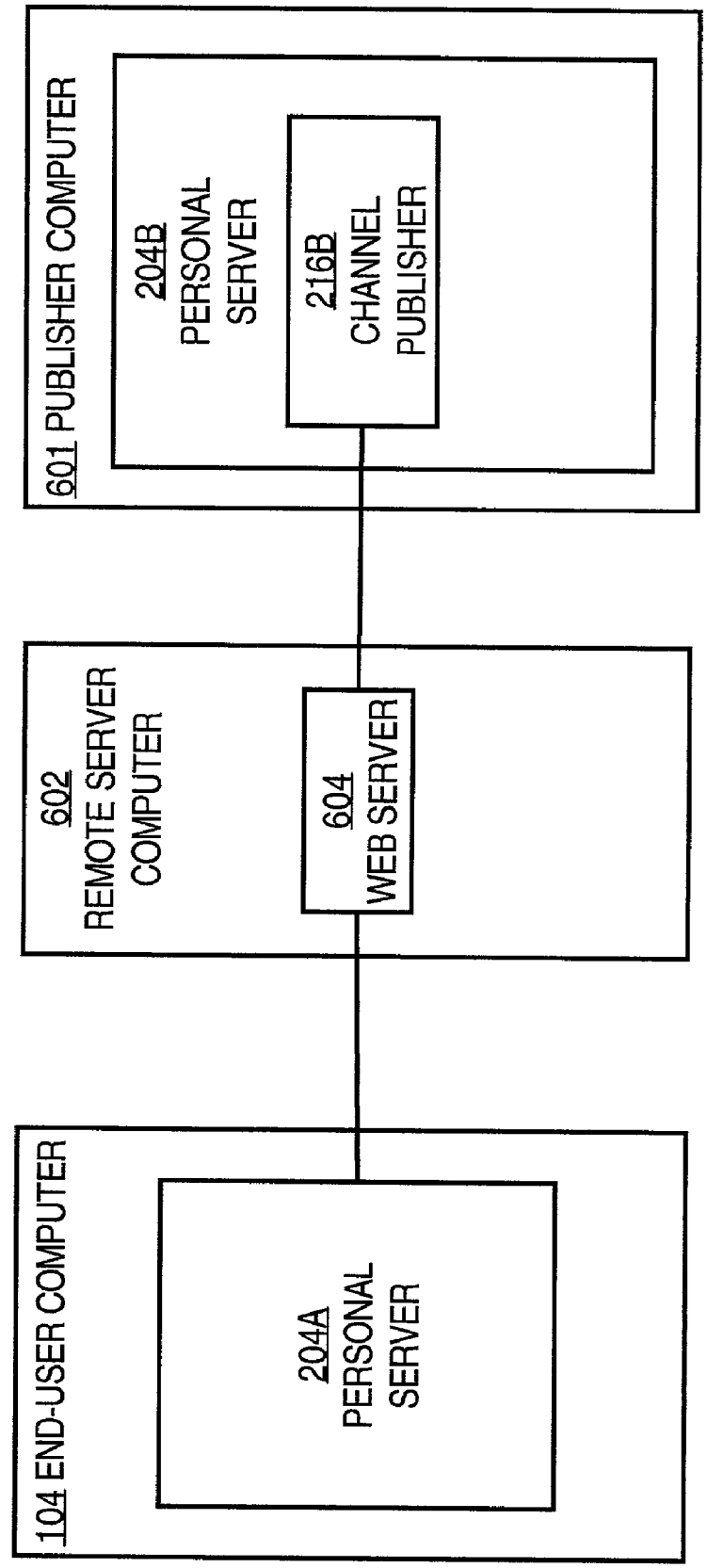
FIG. 6B is a block diagram showing a structural arrangement and communication paths followed in a Remote Serve approach.

FIG. 6B is a block diagram showing a structural arrangement and communication paths followed in a Remote Serve approach. The Remote Serve approach is favored for publishers who do not have direct access to a computer capable of carrying out the direct serve approach, but who have the permission of another party that does have such a computer (a remote server).

In the Remote Serve arrangement, end user computer 104 executes a personal server 204A of the type described herein with reference to FIG. 2. Personal server 204A is communicatively coupled directly or indirectly through one or more networks to a Web server 604 hosted at a remote server computer 602. The remote server computer 602 is communicatively coupled to a channel publisher 216B, which executes as part of personal server 204B at publisher computer 601. The publisher computer 601 is only intermittently connected to the Internet or has neither a static IP address nor a DNS name. The channel publisher 216B uploads new raw data to the remote server computer 602 when it is connected using a standard or proprietary protocol. The remote server computer 602 makes the raw data available to personal server 204A of end user computer 104, or any other personal server associated with an end user computer, using standard protocols. The publisher distributes the channel using as the location of the raw data stream a URL to the remote server.

Figure 6C:
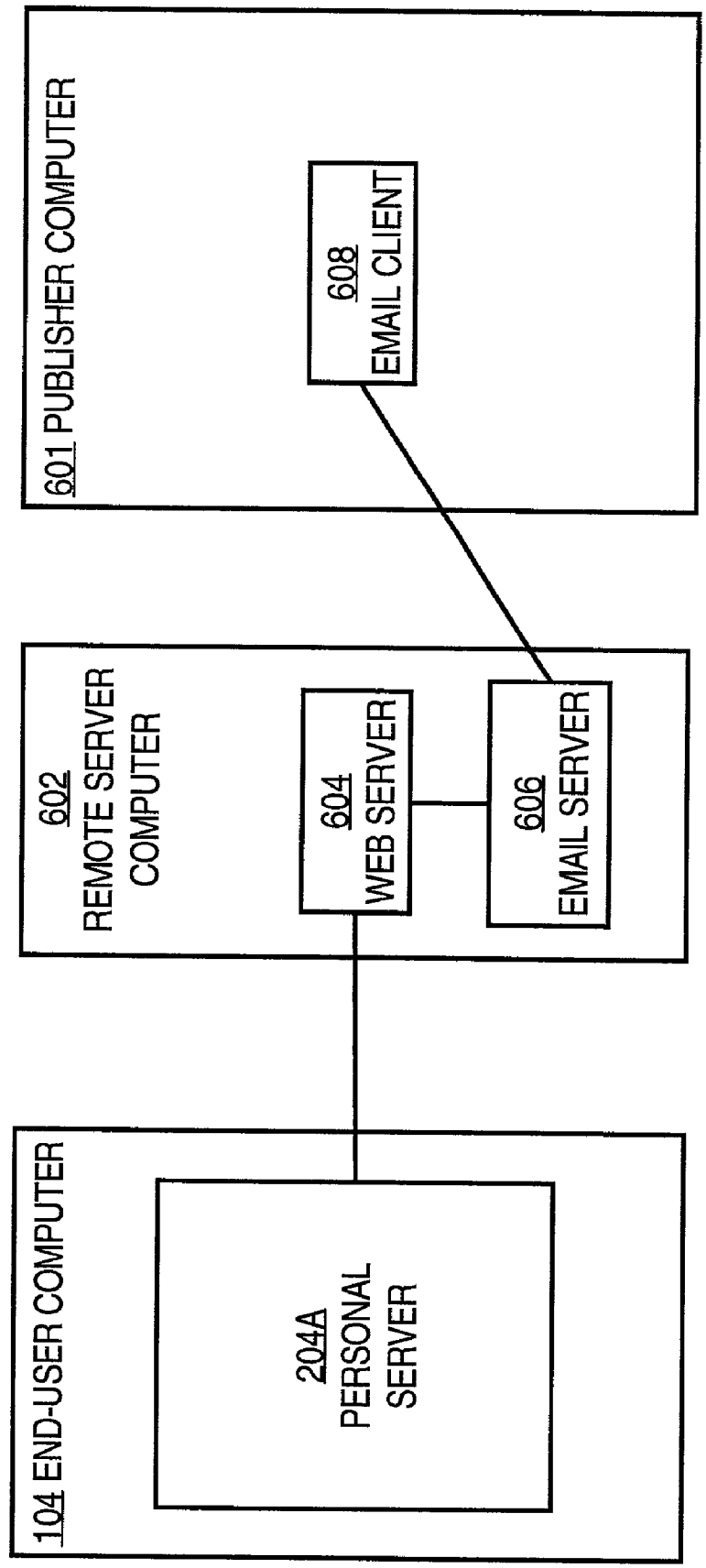
FIG. 6C is a block diagram showing a structural arrangement and communication paths followed in a Remote Serve Via E-mail approach.

FIG. 6C is a block diagram showing a structural arrangement and communication paths followed in a Remote Serve Via E-mail approach. The Remote Serve via E-mail approach is similar to the Remote Serve approach of FIG. 6B, except that the publisher computer 601 uploads new raw data to the remote server computer 602 using e-mail instead of a protocol such as HTTP or FTP.

Accordingly, publisher computer 601 executes an email client 608 that is communicatively coupled to a compatible email server 606 at remote server computer 602. In advance, the publisher computer 601 and the remote server computer 602 agree on an e-mail account that is used for transmission of content. Periodically, publisher computer 601 sends updated content in an email message from email client 608 to email server 606. When new update e-mails arrive at the remote server computer 602, it extracts data from the message body and makes the data available to personal server 204A of end-user computer 104, or other personal servers through standard protocols. For example, the e-mail server 606 forwards the raw data to a Web server 604.

In this approach, the publisher is freed from using any special channel publishing software. The publisher needs only an e-mail client to send new raw data. The publisher distributes the channel using a URL to the remote server as the location of the raw data stream.

Figure 6D:
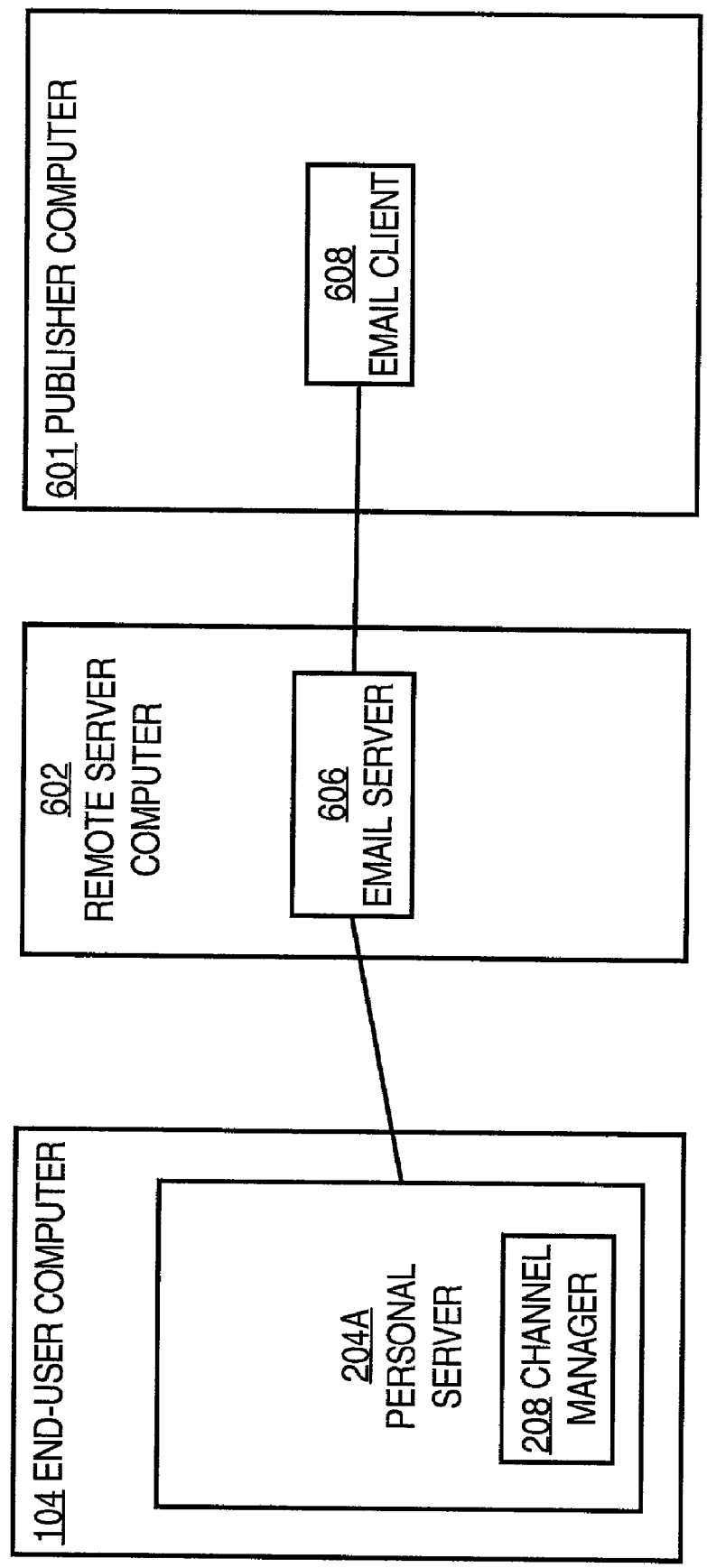
FIG. 6D is a block diagram showing a structural arrangement and communication paths followed in an E-mail Only approach.

FIG. 6D is a block diagram showing a structural arrangement and communication paths followed in an E-mail Only approach. The E-mail Only approach frees the publisher from both special channel publishing software and dependence on a remote server. Publisher computer 601 is provided with an email client 608 that is compatible with an email server that is executed at remote server computer 602. End-user computer 104 executes personal server 204A. Publisher computer 601 has a standard e-mail account on email server 606 that can be accessed using SMTP (Simple Mail Transfer Protocol), POP, IMAP, WebDAV, or HTML.

To update the raw data stream, publisher computer 601 uses email client 608 to send e-mail with the new raw data to the pre-defined account. The publisher distributes the channel using reference information to this e-mail account. Periodically, channel manager 208 of personal server 204A fetches the new raw data in the manner described above in section II.D.

III. Disclosure-Free Targeted Advertising

According to one embodiment, a method and apparatus for delivering targeted advertising to end-users over a network are provided. The disclosed method and apparatus provide such advertising without requiring the end-user to disclose any personal information to the advertiser or any third party.

In targeted advertising over a network, electronic advertising is delivered to an end-user over a network connection, and the advertising is specifically chosen based on information known about that end-user. The known information may comprise, among other data, the country in which the user is located, the kind of computer or browser that the user is using, product or information preferences derived from past network resources that the user has recently viewed, etc. In other approaches, targeted advertising requires the disclosure, either implicitly or explicitly, of such information by the end-user to the advertiser or a third-party acting on the advertiser's behalf. In this context, the term "advertisers" refers both to direct advertisers and such third parties. A user may provide such disclosure by entering data in an online form, completing a survey, etc.

In one specific implementation, the end-user explicitly discloses information by filling out a survey form. In another implementation, the end-user implicitly discloses information by visiting various Web sites all connected by the same advertising network. The advertising network tracks individual end-users by placing cookies in their browsers, and can monitor which Web sites they visit and for how long. In another implementation, the end-user downloads software to their end-user computer that examines the contents of local information or monitors the actions of the user, and delivers this information to the advertiser.

According to an embodiment, advertising can be targeted without requiring the end-user to disclose private information to an advertiser. In other approaches, the end-user discloses information, and the advertiser uses that information in a decision process to select an appropriate advertisement. The decision process may be implemented in the form of one or more software elements that execute at the end-user's computer. In one approach disclosed herein, the advertiser discloses to the end-user its decision process. An advertising agent executes at the end-user's computer. The advertising agent obtains one or elements of private or personal information about the end-user locally, without disclosing it to the advertiser over the network. The advertising agent executes or applies the decision process to the personal information to result in selecting an advertisement. The advertisement is then delivered to the end-user. No private information is disclosed to the advertiser in this process.

FIG. 7A illustrates an example embodiment of an arrangement for providing disclosure-free targeted advertising. End-user computer 104 executes a browser 108 and an advertising agent 702. End-user computer 104 is communicatively coupled through network 102 to server computer 704. Server computer 704 may store a decision process 705 and one or more advertisements 707.

The decision process may be embodied as a computer program to be executed by the advertising agent. The program is given access to information on the end-user computer in order to make selection choices. Such access may include access to all local resources such as files in persistent storage on a hard drive or other medium, or access to information the end-user has specifically made available to the agent. The decision process may comprise code in a programming or scripting language that is executed by a processor/interpreter embedded in the personal server and makes use of data on the end-user computer. There may be a single decision process or a plurality of decision processes that are applicable to different classes of users or contexts.

Once the decision process is complete and an advertisement is selected, it is presented. The advertisements may be stored on the advertiser's server computer, in which case the advertising agent downloads the appropriate advertisement. However, in doing so the advertising agent discloses a small amount of information about the end-user. Because the advertiser has knowledge of the decision processes and the outcome, it can make inferences as to particular information on the end-user computer that may have lead to that outcome. If this minor disclosure is anonymous, the advertiser cannot attribute the inference to any specific person, and cannot construct profiles over time by gather information that is attributable to a single person. For example, a number of end-users may collaborate to establish a peer proxy pool in which for each disclosure, an end-user will randomly select another end-user in the pool to serve as a proxy agent to communicate with the advertiser or third party. In this manner, neither a particular inference nor a stream of inferences can be attributed to a single person. Larger pools confer greater anonymity.

Alternatively, the advertising agent may download all of the possible advertisements together with the decision process. In this approach, once the decision process is complete, the advertising agent simply serves the advertisement from its own local cache, and nondisclosure is complete.

The description herein assumes that the advertisements are bundled with the decision process. In an alternative approach, when the advertisements are not bundled, there is an extra step after the decision process to fetch the selected advertisement from the server computer.

Figure 7B:
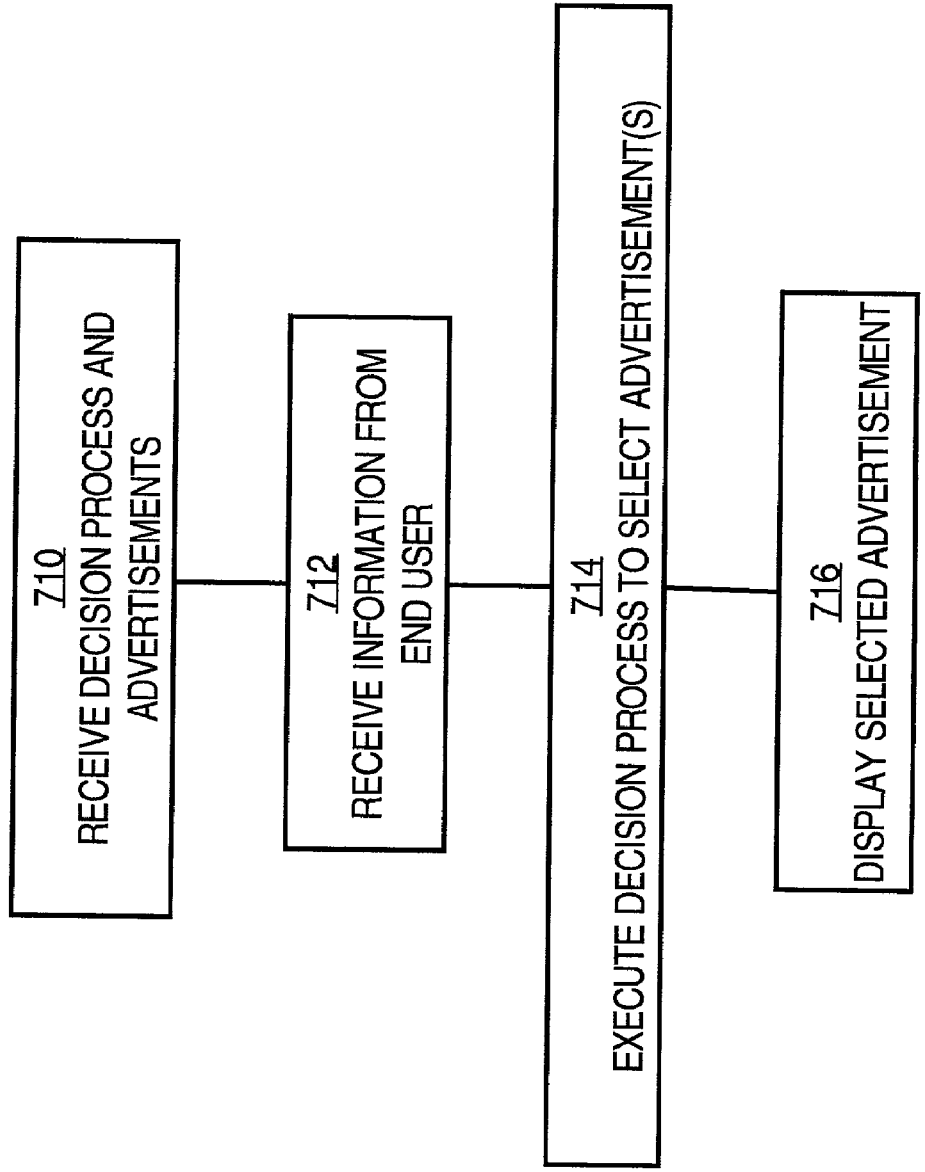
FIG. 7B is a flow diagram of a first approach to delivering disclosure-free targeted advertising.

FIG. 7B is a flow diagram of a first approach to delivering disclosure-free targeted advertising.

In block 710, a decision process and advertisements are received. For example, advertising agent 702 on the end-user computer 104 downloads the decision process 705 and advertisements 707 from the advertiser's server computer 704.

In block 712, one or more elements of information are received from the end-user. Such information may be obtained explicitly or implicitly using any of the mechanisms disclosed above in this section.

In block 714, the decision process is executed locally, using the information that was received in block 712. For example, advertising agent 702 locally executes decision process 705 after downloading it, based on information that the advertising agent has received from the end-user. Execution of the decision process results in selecting one or more advertisements for display to the end-user, based on the received personal or private information.

In block 716, the selected one or more advertisements are displayed. For example, advertising agent 702 displays the selected one or more advertisements in Web browser 108 using a loopback connection. Alternatively, advertising agent 702 may directly generate and display advertisements, e.g., in the form of pop-up windows that appear in the user interface, by generating instant messages, by generating email messages in an in-box of an email client, etc. The specific form of display or mechanism used to generate the display is not critical.

FIG. 7C is a flow diagram of a second approach to delivering disclosure-free targeted advertising.

In block 720, a Web page containing one or more embedded advertisements is requested. For example, an end-user requests a Web page with embedded advertisements through a Web browser. In block 722, a server provides a Web page in response, wherein the Web page contains one or more references to embedded advertisements that refer to the local host. Thus, the server replies with a Web page where the references to embedded advertisements refer to the local host.

In block 724, the Web server makes a request to the local host according to the reference for the advertisement.

In block 726, the decision process and one or more advertisements are obtained either from a cache or by downloading from the server. For example, advertising agent 702, which runs on the end-user computer 104 and is bound to the port specified by the embedded references in the Web page, downloads the decision process 705 and advertisements 707 from the server computer 704, if they are not already cached from a previous interaction.

In block 728, the decision process is executed locally. The decision process is based on information that is received from the user at an earlier stage, e.g., using the process of block 712. For example, advertising agent 702 locally executes decision process 705 after downloading it, based on information that the advertising agent has received from the end-user. Execution of the decision process results in selecting one or more advertisements for display to the end-user, based on the received personal or private information.

In block 730, one or more selected advertisements are returned to the Web browser. For example, advertising agent 702 provides information identifying the selected advertisements to the Web server.

Figure 7D:
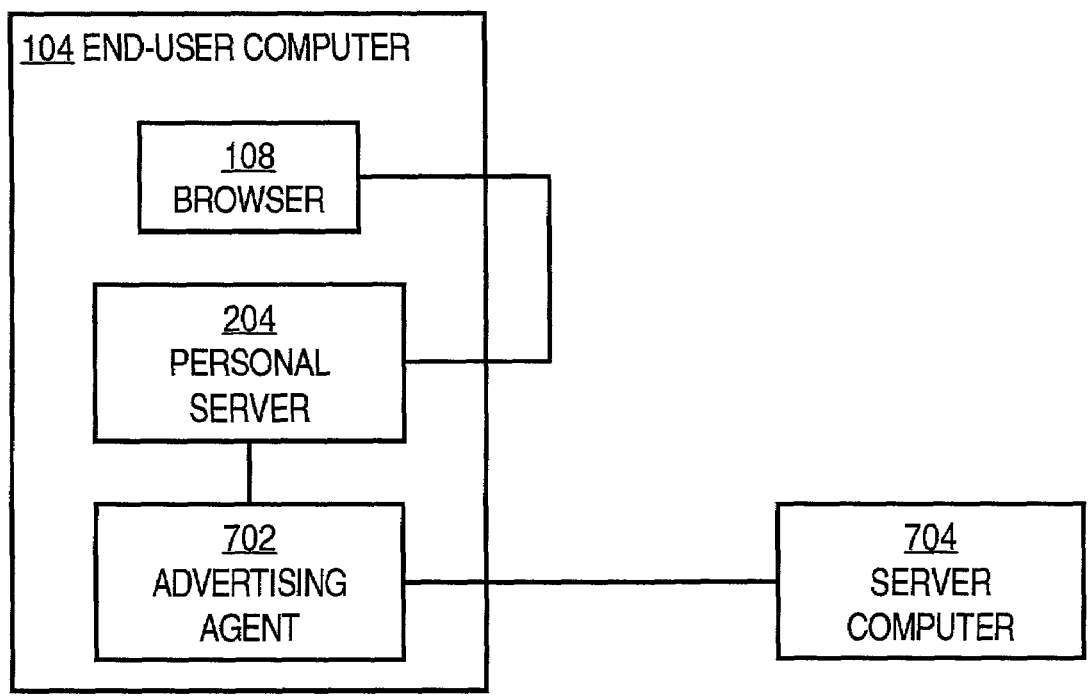
FIG. 7D is a block diagram of an approach in which an advertising agent is integrated with a personal server.

FIG. 7D is a block diagram of an approach in which an advertising agent is integrated with a personal server.

In this approach, end-user computer 104 executes a browser 108, which is communicatively coupled over a loop-back connection to personal server 204. Advertising agent 702 executes as a separate process that may communicate with personal server 204 using any suitable approach, such as RPC. Advertising agent 702 also is communicatively coupled indirectly through one or more networks to server computer 704. Electronic advertisements and a decision process are stored at server computer 704.

Figure 7E:
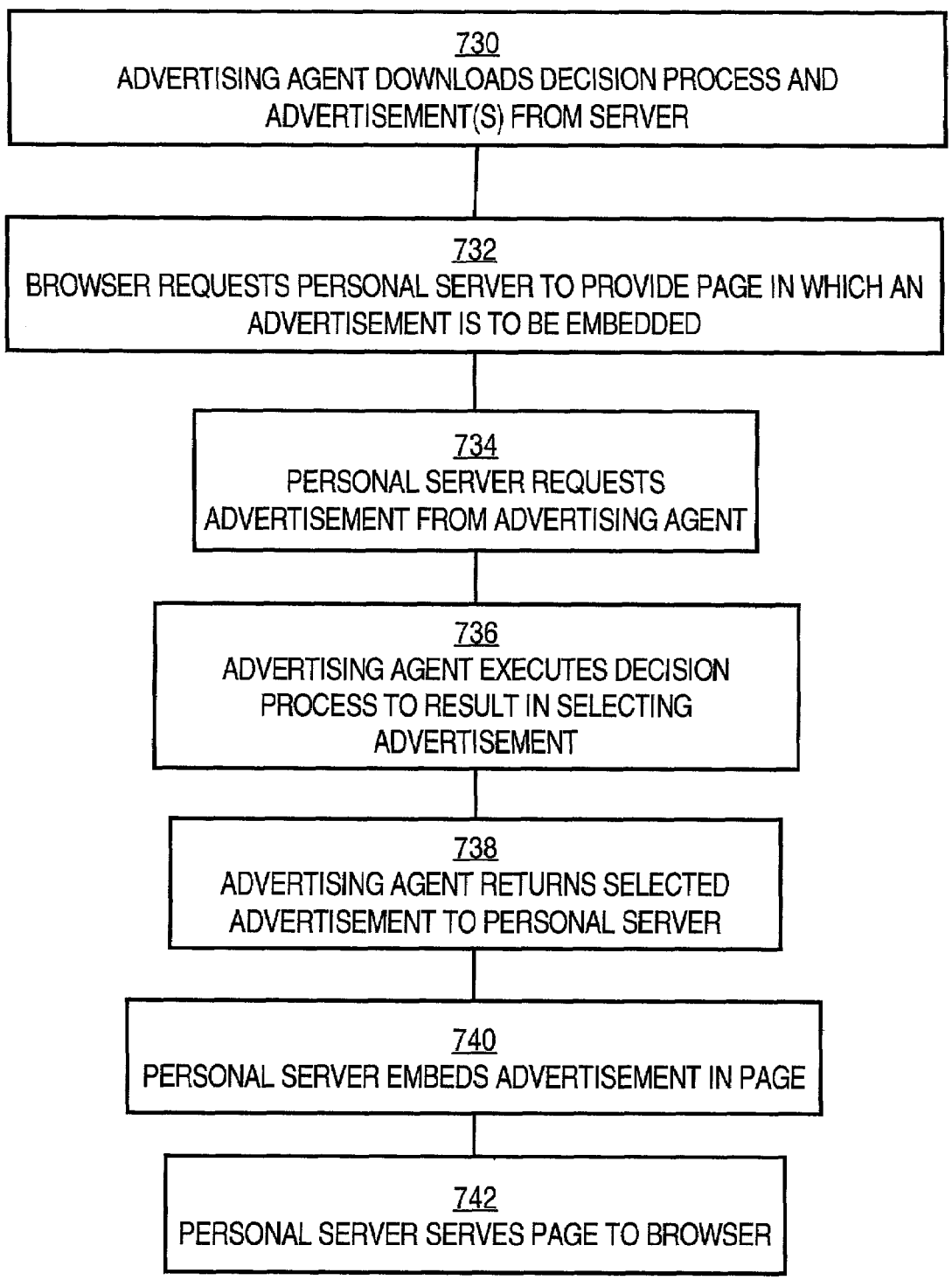
FIG. 7E is a flow diagram illustrating a process of using the system of FIG. 7D for disclosure-free targeted advertising.

FIG. 7E is a flow diagram illustrating a process of using the system of FIG. 7D for disclosure-free targeted advertising. Although FIG. 7E is described herein in the context of FIG. 7D for the purpose of illustrating an example, embodiments are not limited to that context.

In block 730, the advertising agent downloads the decision process and one or more advertisements from the server computer. Block 730 may be carried out at any convenient time, e.g., when end-user computer 104 boots, when browser 108 initializes, etc.

In block 732, the browser requests a page or electronic document from the personal server, in which an advertisement is to be embedded. For example, in response to user input, the browser may request a page that contains one or more hyperlinks to electronic advertisements or references to such advertisements. Such hyperlinks need not be explicit links to particular electronic documents or applications, but may comprise placeholders such that a specific targeted advertisement is inserted according to subsequent processing steps.

In block 734, the personal server requests an advertisement from the advertising agent. In block 736, the advertising agent executes the decision process, to result in selecting one or more specific targeted advertisements. In block 738, the selected advertisement is handed back to the personal server. In block 740, the personal server embeds the advertisement into the page. In block 742, the personal server serves the page containing the embedded targeted advertisement back to the browser.

Accordingly, one or more advertisements that are targeted to a particular computer user may be selected and delivered to the user, based on personal information about the user, without requiring the user to disclose private or personal information to the advertiser. All such information remains at the end-user computer and is evaluated only by the advertising agent running locally at the end-user computer. No personal information is sent over the network to the server.

IV. Intercommunication Between Intermittently Connected Network Nodes Over E-Mail Infrastructure Certain aspects of the invention relate to a method and apparatus for computers on a network to communicate programmatically when the computers are only intermittently connected.

Figure 8A:
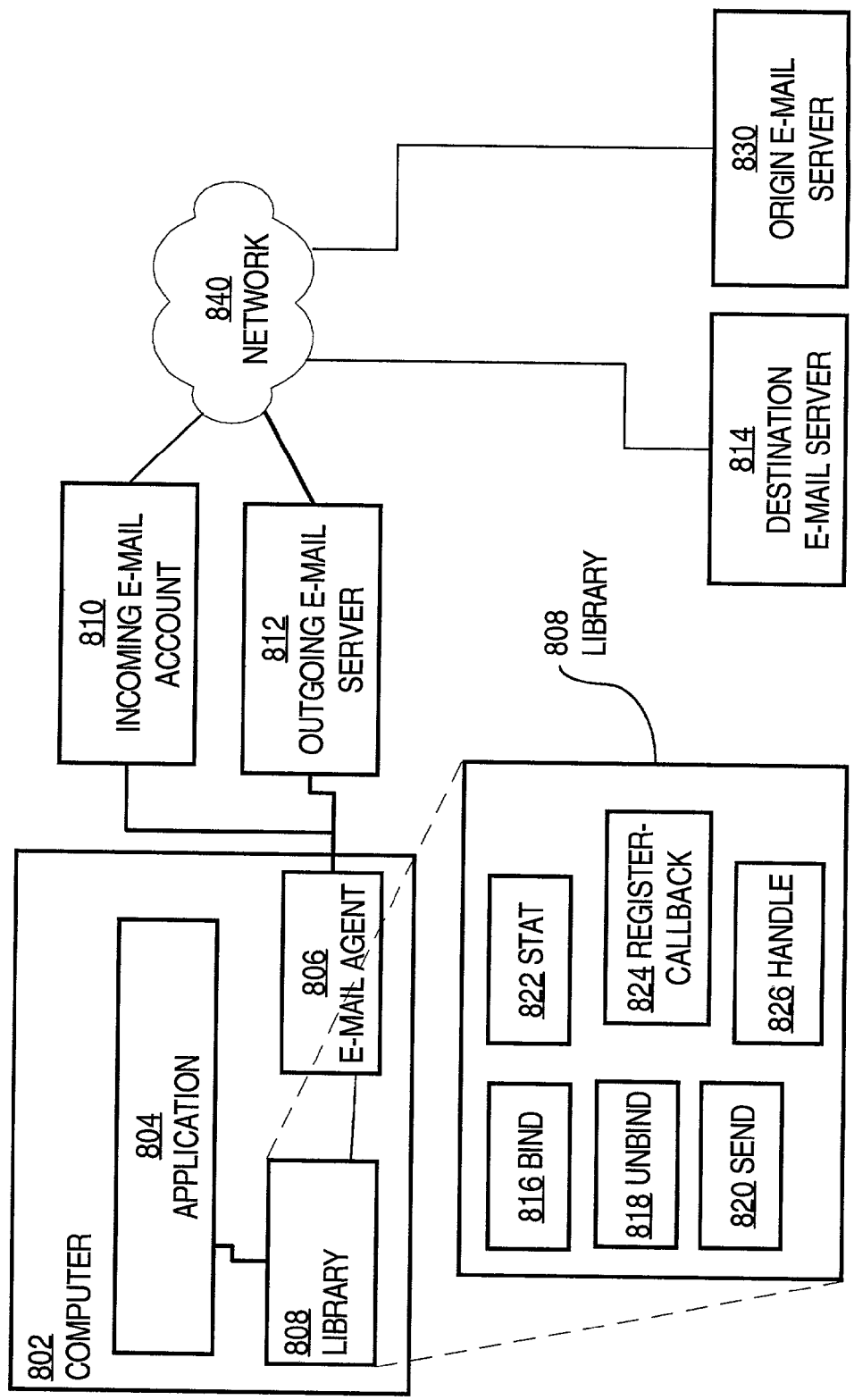
FIG. 8A is a block diagram of a system arrangement that may accomplish such programmatic communication among intermittently connected computers.

FIG. 8A is a block diagram of a system arrangement that may accomplish such programmatic communication among intermittently connected computers. A computer 802 executes an application 804, which has access to an e-mail agent 806 and a function library 808. Each computer on the network wishing to participate in intermittently connected communication is provided with library 808 and agent 806.

Thus, although only one computer 802 having such elements is illustrated in FIG. 8A, in a practical system there may be any number of computers in the network that have such elements.

Each e-mail agent 806 is associated with an outgoing e-mail server 812 and an incoming e-mail account 810. An incoming e-mail account is maintained on incoming e-mail account 810. The outgoing e-mail server 812 typically accepts outgoing e-mail using the SMTP protocol. The provider of the incoming e-mail account 810 provides programmatic access to the contents of the account. Suitable protocols for such access include SMTP, POP, IMAP, WebDAV, or HTTP. The incoming account used may be dedicated to use by the processes described herein, or it may be shared with human-readable e-mail.

The library 808 comprises one or more software elements that implement a set of function calls and associated code that may be linked into application 804, or any other application running on the computer 802. Library 808 provides application 804 with an application programming interface to the e-mail agent 806.

In one embodiment, library 808 comprises a bind function 816, unbind function 818, send function 820, stat function 822, register-callback function 824, and handle function 826. Each such function call is now described in a plurality of sub-sections. In each sub-section, the name of the function call is presented first. The parameters of the function are in parentheses, separated by commas. The return value(s) of the function follow the arrow.

Bind Function 816 bind (port)→handle or error code

The e-mail agent 806 provides an infinite number of virtual channels called ports that are numbered from one to infinity. The calling application specifies which port number to which it intends to bind. When the BIND function 816 is called, the e-mail agent checks whether the requested port has already been bound. If so, it returns an error. If not, it binds the application 804 to the port and returns a handle that the application will use later to refer to this port.

The handle is non-forgeable by other applications with certainty or a high probability. The e-mail agent 806 maintains a mapping of handles to ports and vice-versa. Subsequent calls from application 804 or any other application to bind a previously bound port generate errors. A single application may bind to multiple ports.

Unbind Function 818 unbind (handle)→error code

The calling application provides a handle to port to which it is bound. If the handle is invalid, an error is returned. Otherwise, the e-mail agent 806 discards the handle to port mapping, and marks the associated port free. Once the port is unbound, it may again be bound by any application.

Send Function 820 send (address, port, payload, handle)→error code

The calling application must specify a destination e-mail address, a destination port, a data payload, and optionally, a handle. The e-mail agent 806 may compress, encrypt, translate, or otherwise transform the data payload. The payload may be transformed any number of times before delivery. The data payload is encapsulated with a header indicating whether the payload is transformed, by what scheme, and what the destination and origin e-mail addresses and ports are. The encapsulated data payload is further encapsulated in a standard mail message. A special e-mail header is added to indicate this is a message generated by the agent, and is not meant to be human readable. The message is then delivered to the outgoing e-mail server 812.

If the computer 802 is not currently connected to network 840, delivery of the encapsulated message is deferred until the computer becomes connected to the network. If a handle is specified, the e-mail agent 806 uses the associated port as the port of origin. If no handle is specified, then the e-mail agent 806 temporarily binds the application 804 to some unbound port while it sends this message, and then unbind it when the message delivery is complete. This function call returns without waiting to confirm delivery or receipt.

Stat Function 822 stat (handle)→count or error code

E-mail agent 806 periodically accesses its associated incoming e-mail account 810 for new messages. If new messages are present, e-mail agent 806 downloads such messages to computer 802. In one embodiment, e-mail agent 806 only downloads messages with the special header indicating that another e-mail agent sent the messages. This allows the agent 806 to use an e-mail account 810 that is shared with human readable mail.

For each message that is downloaded, e-mail agent 806 examines the body of the message and removes the header. If the header indicates that the payload is transformed, then e-mail agent 806 applies one or more reverse transformations according to the scheme specified in the header. The data payload is then stored locally, associated with the destination port number.

Application 804 checks for new messages on any of its bound ports by calling the STAT function 822 with a handle to one of its bound ports. If the e-mail agent 806 has received any messages destined for that port, it returns the number of pending messages. If the handle is invalid, an error is returned.

Register-Callback Function 824 register_cback (cback)→error code

Application 804 uses the register-callback function 824 to register a callback procedure. When a callback procedure is registered, e-mail agent 806 asynchronously calls the callback procedure to notify application 804 whenever a new message is received on any of its bound ports.

Handle Function 826 receive (handle)→payload or error code

Application 804 or another calling application specifies a handle. If the handle is invalid, an error is returned. If it is valid, the e-mail agent 806 returns the data payload associated with the port with the earliest time of receipt. E-mail agent 806 then deletes the payload from its own storage. If there are no pending incoming messages on the port specified by the application, an error is returned.

Figure 8B:
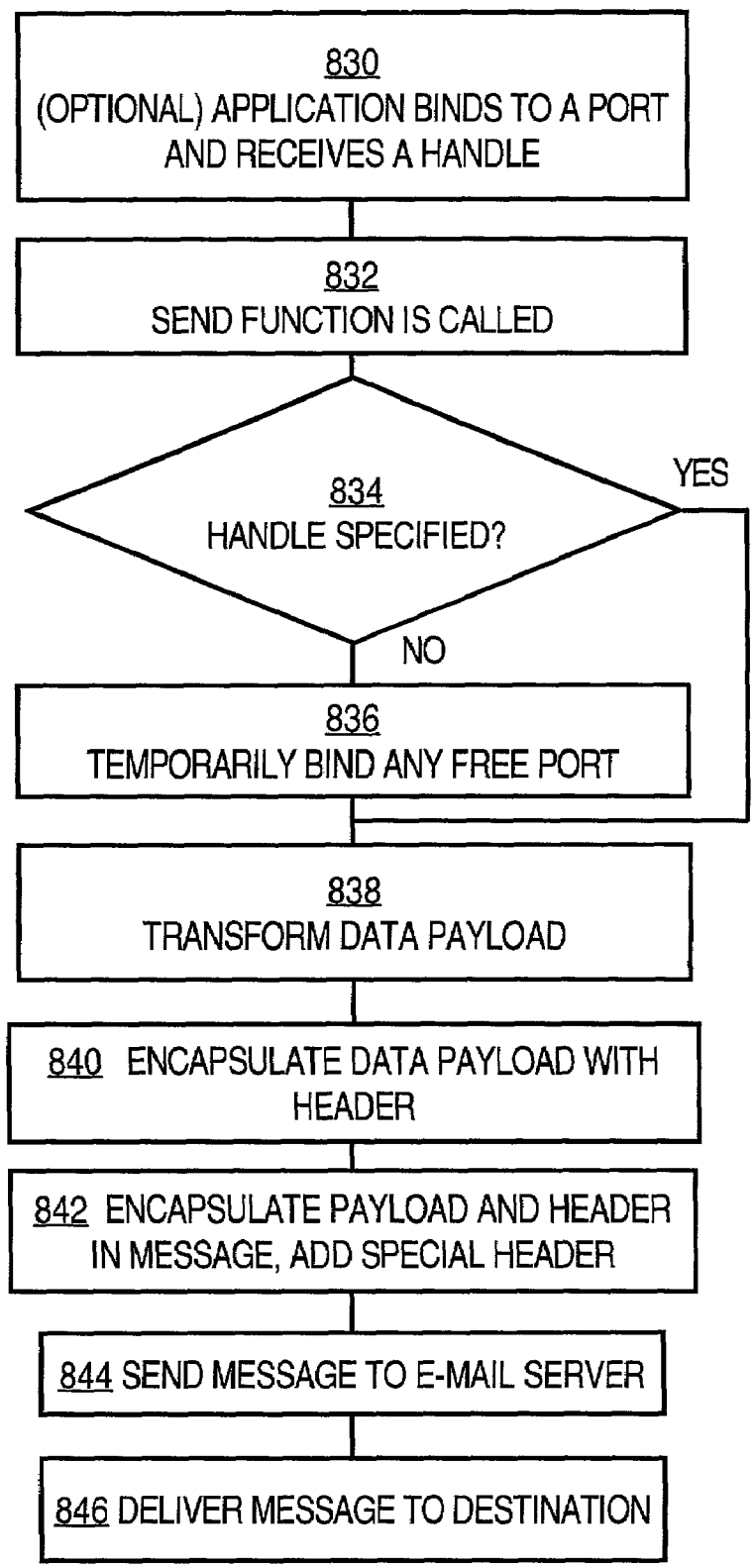
FIG. 8B is a flow diagram of a process of sending outbound communication messages using the system of FIG. 8A.

FIG. 8B is a flow diagram of a process of sending outbound communication messages using the system of FIG. 8A. Although FIG. 8B is described herein in the context of FIG. 8A for the purpose of illustrating an example, embodiments are not limited to that context.

In block 830, which is an optional step, an application binds to a port and receives a handle for referencing the port. In one embodiment, application 804 calls the bind function 816 to bind to a specific port and receives a handle in response.

In block 832, the application initiates outbound communication by calling the SEND function. In one embodiment, the SEND call includes a destination e-mail address, a destination port, a data payload, and a handle, if the application received a handle in block 830.

In block 834, the process determines whether a handle is specified in the SEND function call. If a handle is not specified, then the e-mail agent temporarily binds any free port to the application, as indicated by block 836. Alternatively, control proceeds to block 838. In block 838, the data payload provided by the application is transformed.

In block 840, the processed payload is encapsulated with a header. The header specifies the encryption and compression schemes, if any, and the destination address and port, and the origin address and port. In block 842, the payload and header are encapsulated in an e-mail message, and the special header is added.

In block 844, the mail message is sent to a server, e.g., the outgoing e-mail server 812. In block 846, the server delivers the message to the destination e-mail account.

Figure 8C:
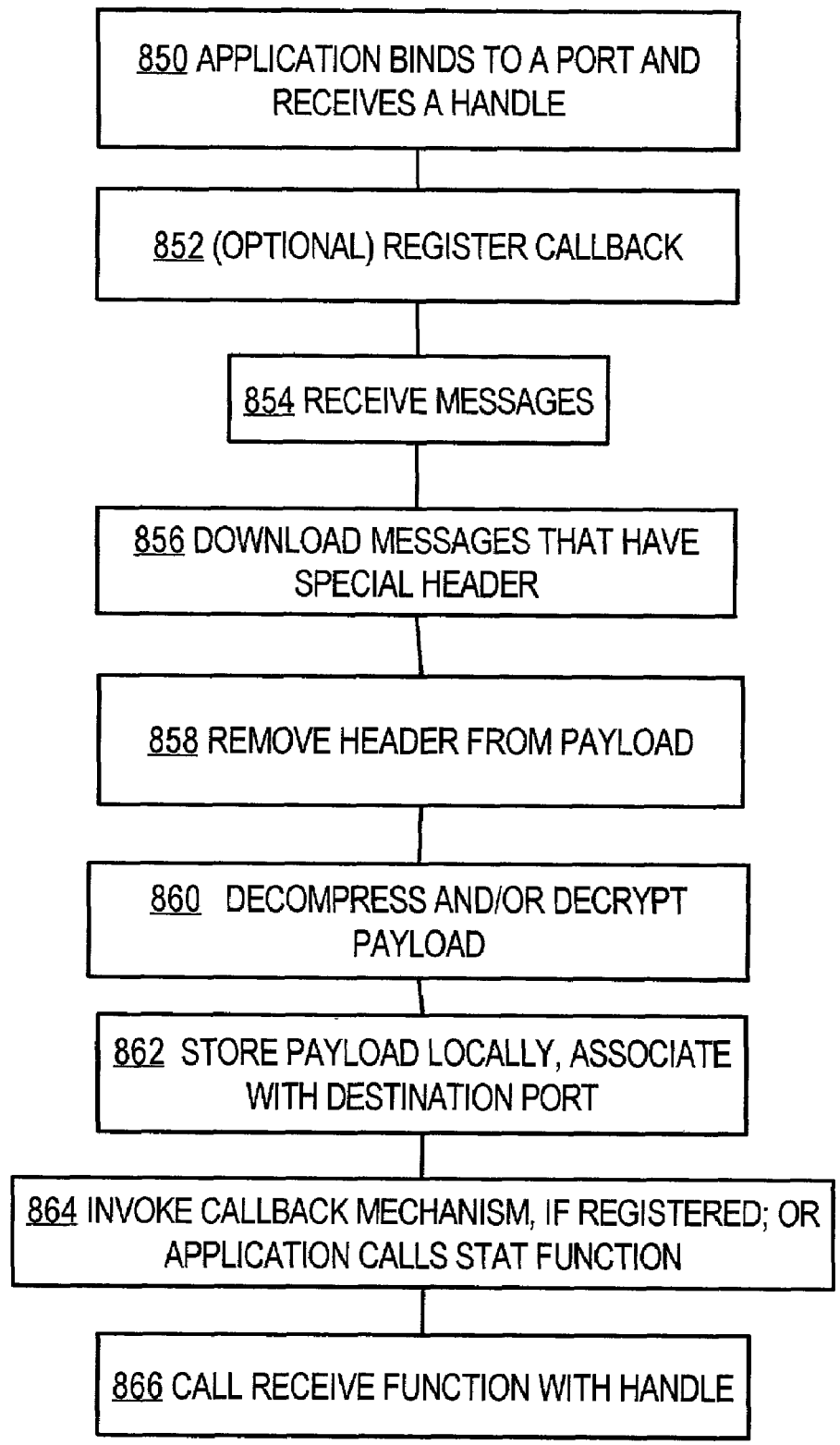
FIG. 8C is a flow diagram of a process of receiving inbound communication messages using the system of FIG. 8A.

FIG. 8C is a flow diagram of a process of receiving inbound communication messages using the system of FIG. 8A. Although FIG. 8C is described herein in the context of FIG. 8A for the purpose of illustrating an example, embodiments are not limited to that context.

In block 850, the receiving application binds to a port and receives a handle. For example, application 804 calls the BIND function 816 to bind to a specific port that is managed by e-mail agent 806, and receives a handle in response. Optionally, in block 852, the application calls the REGISTER-CALLBACK function to register a callback mechanism with the e-mail agent.

In block 854, the incoming e-mail server receives messages from other e-mail servers. Block 854 may represent a background process that runs continuously independent of other steps in FIG. 8C.

In block 856, messages having the special header are downloaded. In one embodiment, the e-mail agent 806 checks the incoming e-mail account 810 periodically, and downloads any messages that are marked with the special header.

Block 858 through block 866 represent steps that are carried out for each message that is downloaded in block 856. In block 858, the agent removes the header from the payload. The agent applies reverse transformations to the payload, as indicated by the header, in block 860. In block 862, the agent stores the payload locally and associates it with the destination port indicated by the header.

In block 864, if a call back mechanism has been registered, the e-mail agent invokes the mechanism. Alternatively, the application calls the STAT function to determine whether there are new messages available. The e-mail agent returns a positive number.

In block 866, the application calls the RECEIVE function with a handle. The earliest message destined for the port associated with that handle is returned.

Accordingly, using the foregoing processes, computers that are only intermittently connected to a network may communicate programmatically. The processes enable client-server applications and other cooperative applications to communicate and interact in the absence of a continuous or consistent network connection.

V. Clipping and Embedding in Electronic Documents

According to another embodiment, a method and apparatus are provided for selecting an arbitrary geometric subset of one electronic document and embedding the subset at an arbitrary location of another electronic document.

Figure 9A:
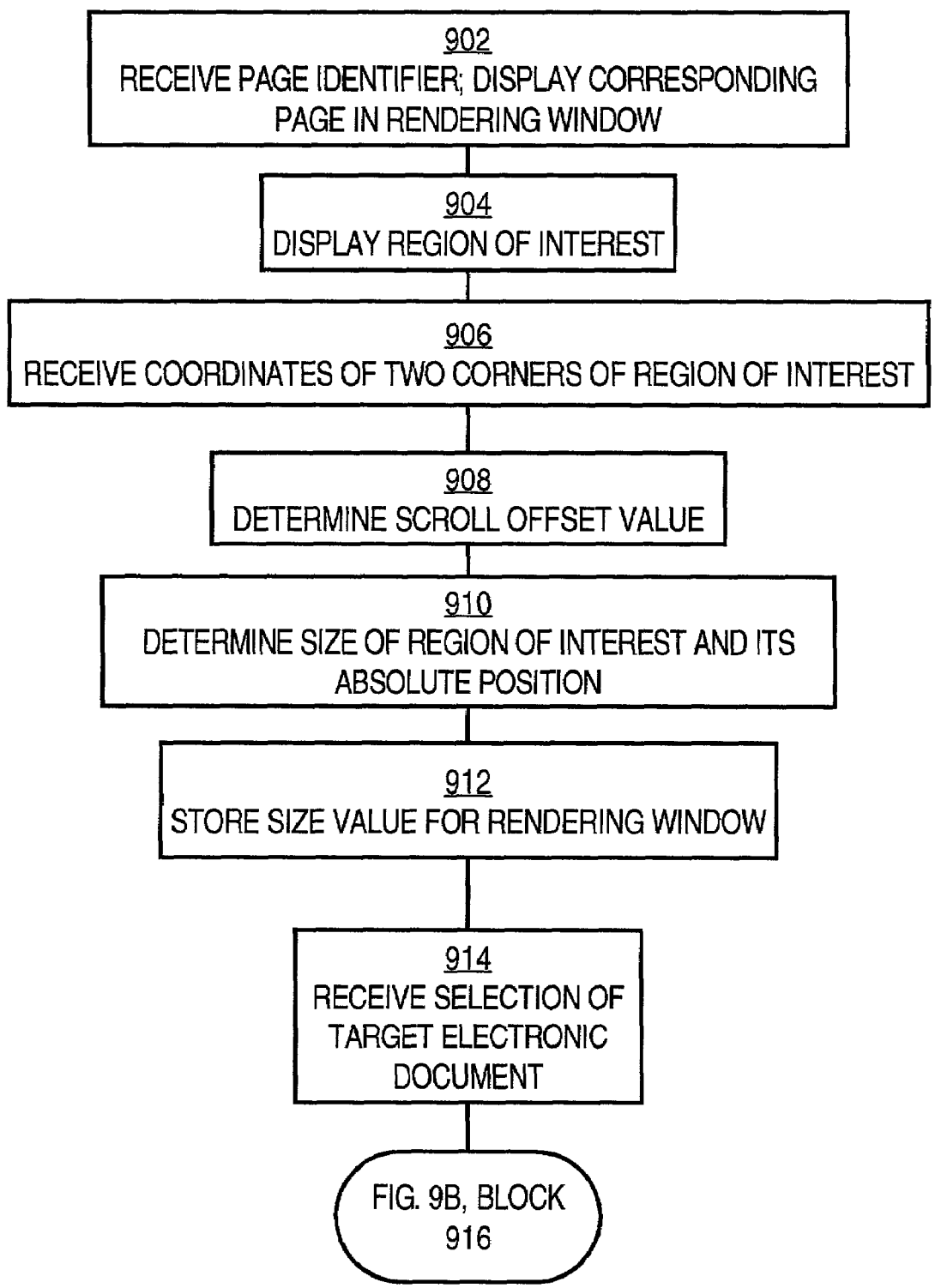
FIG. 9A is a flow diagram of one approach to selecting an arbitrary geometric subset of one electronic document and embedding the subset at an arbitrary location of another electronic document.

FIG. 9A is a flow diagram of one approach to selecting an arbitrary geometric subset of one electronic document and embedding the subset at an arbitrary location of another electronic document. For purposes of illustrating a specific example, FIG. 9A is described herein with reference to a hypothetical screen display as shown in FIG. 9C, FIG. 9D, FIG. 9E. Further, embodiments are described with reference to HTML documents or Web pages. However, embodiments are not limited to this specific context; the approaches disclosed herein may be used equally effective in any computer display environment with any kind of electronic document that comprises a source element that is rendered into a displayed image.

Referring first to FIG. 9A, in block 902 a page identifier is received and a corresponding page is displayed in a rendering window. For example, a user enters a URL into a browser or other application. The application downloads the corresponding Web page from the Internet and displays it in a rendering window on a screen display of a computer associated with the user. This Web page ("source electronic document") is the page from which a subset is selected and placed in another page ("target electronic document"). FIG. 9C is a simplified view of a source electronic document 932.

In block 904, a region of interest is displayed. In one embodiment, the user scrolls the source electronic document, which may be larger than the rendering window, using conventional scroll bars in a browser program, until the region of interest is fully in view in the rendering window. As shown in FIG. 9C, while a browser may display only the contents of rendering window 936, source electronic document 932 may be much larger than the rendering window and therefore a user may need to scroll the display in order to view region of interest 934.

In block 906, coordinates of two corners of the region of interest are received. For example, the user specifies the coordinates of the upper-left and lower-right corners of the region of interest by selecting them with a pointing device. In the example of FIG. 9C, the region of interest is defined by coordinates (x2, y2) and (x3, y3).

In block 908, a scroll offset value is determined. In one embodiment, the application queries the rendering window to determine the amount of offset by which the source electronic document has been scrolled. The offset value is stored and referred to as a coordinate pair (x1, y1).

In block 910, the size of the region of interest is determined and its absolute position is determined. For example, the application calculates the size of the region of interest and its absolute position in the source electronic document. The absolute position is the pair (x5, y5) where x5=x1+x2 and y5=y1+y2. The size of the region is (x6, y6) where x6=x3−x2 and y6=y3−y2. FIG. 9D is a simplified diagram of the relationship of (x5, y5) and (x6, y6) to source electronic document 932 and region of interest 934.

In block 912, a size value for the rendering window is stored. For example, the application stores the size of the rendering window 936 at the time that the user made the selection for the region of interest 934. The size value may be stored as the pair (x4, y4) as shown in FIG. 9C.

In block 914, a selection of a target electronic document is received. In one embodiment, the user selects a second Web page into which the region of interest of the source electronic document is to be embedded. FIG. 9E is a simplified block diagram of a target electronic document 938. The user may cause the application to download the target electronic document from the Internet by specifying a URL, or may be create the target electronic document with an application.

Figure 9B:
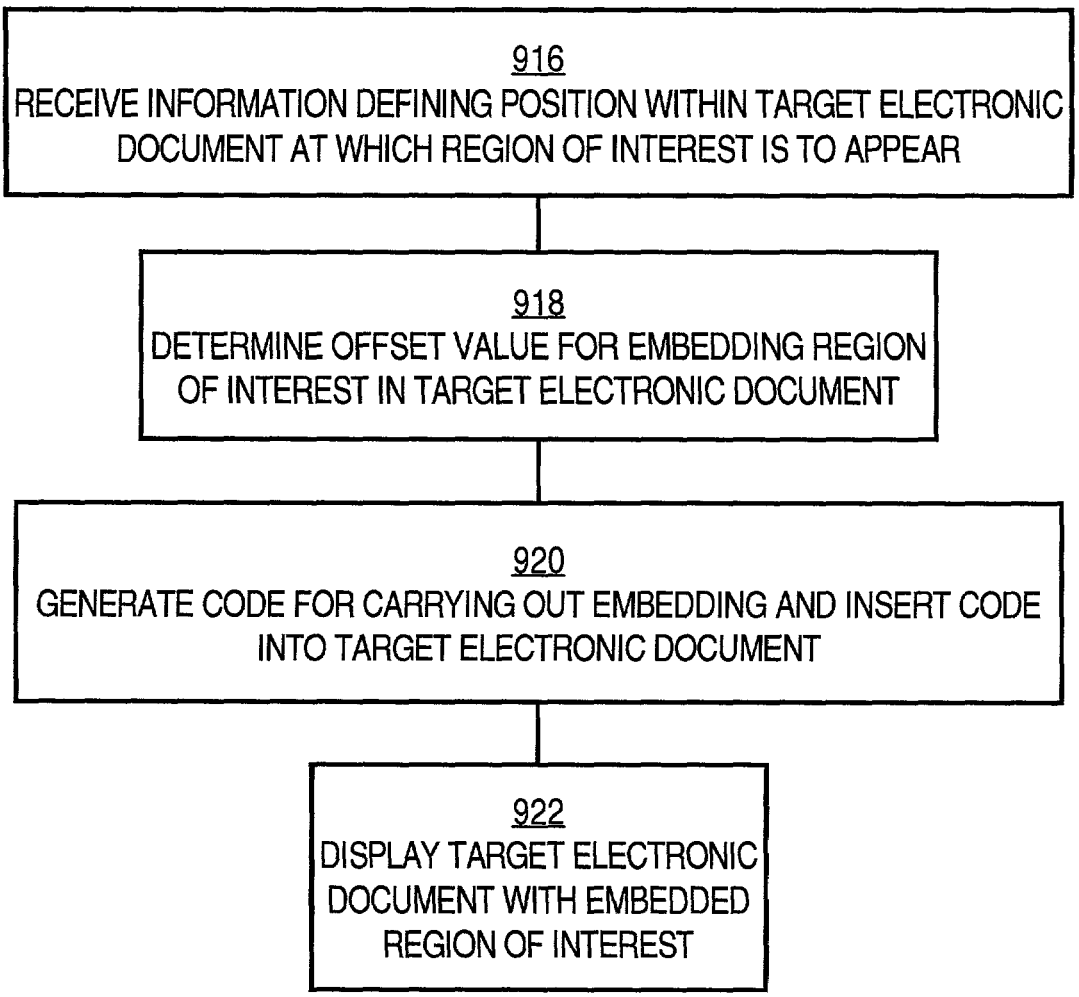
FIG. 9B is a flow diagram of further steps in the approach of FIG. 9A.
Figure 9C:
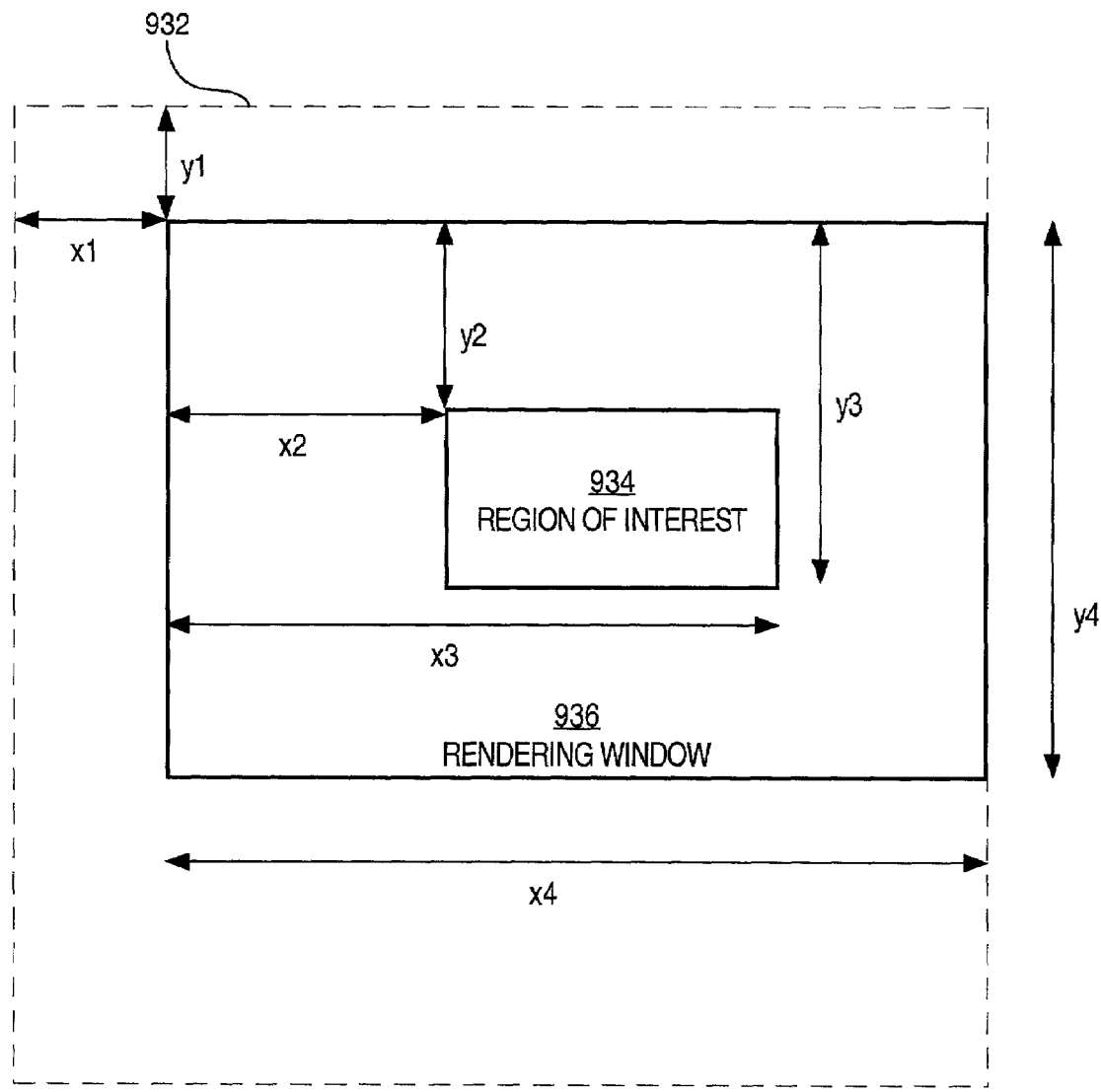
FIG. 9C is a simplified view of a source electronic document.
Figure 9D:
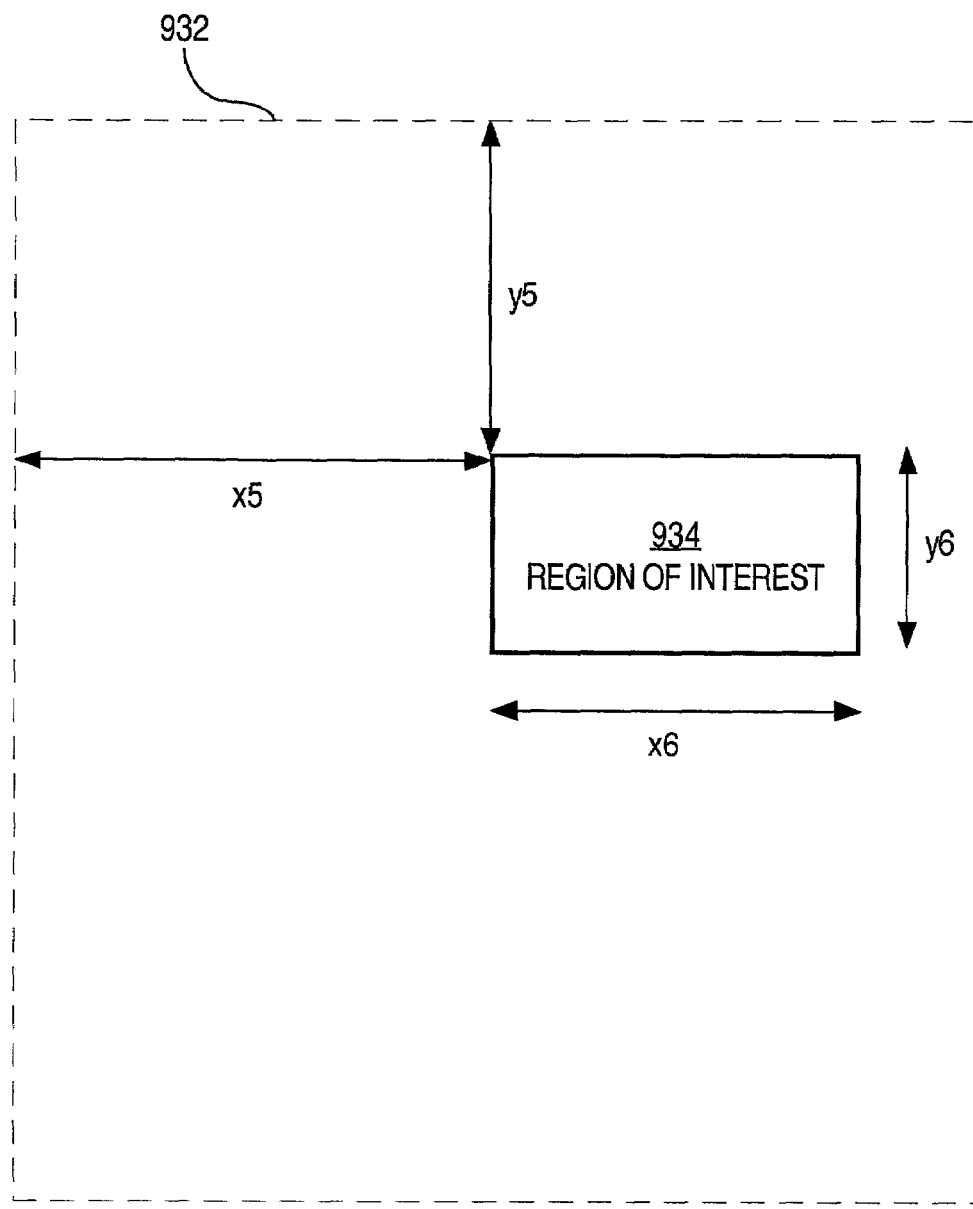
FIG. 9D is a simplified diagram of the relationship of coordinates to a source electronic document and a region of interest.
Figure 9E:
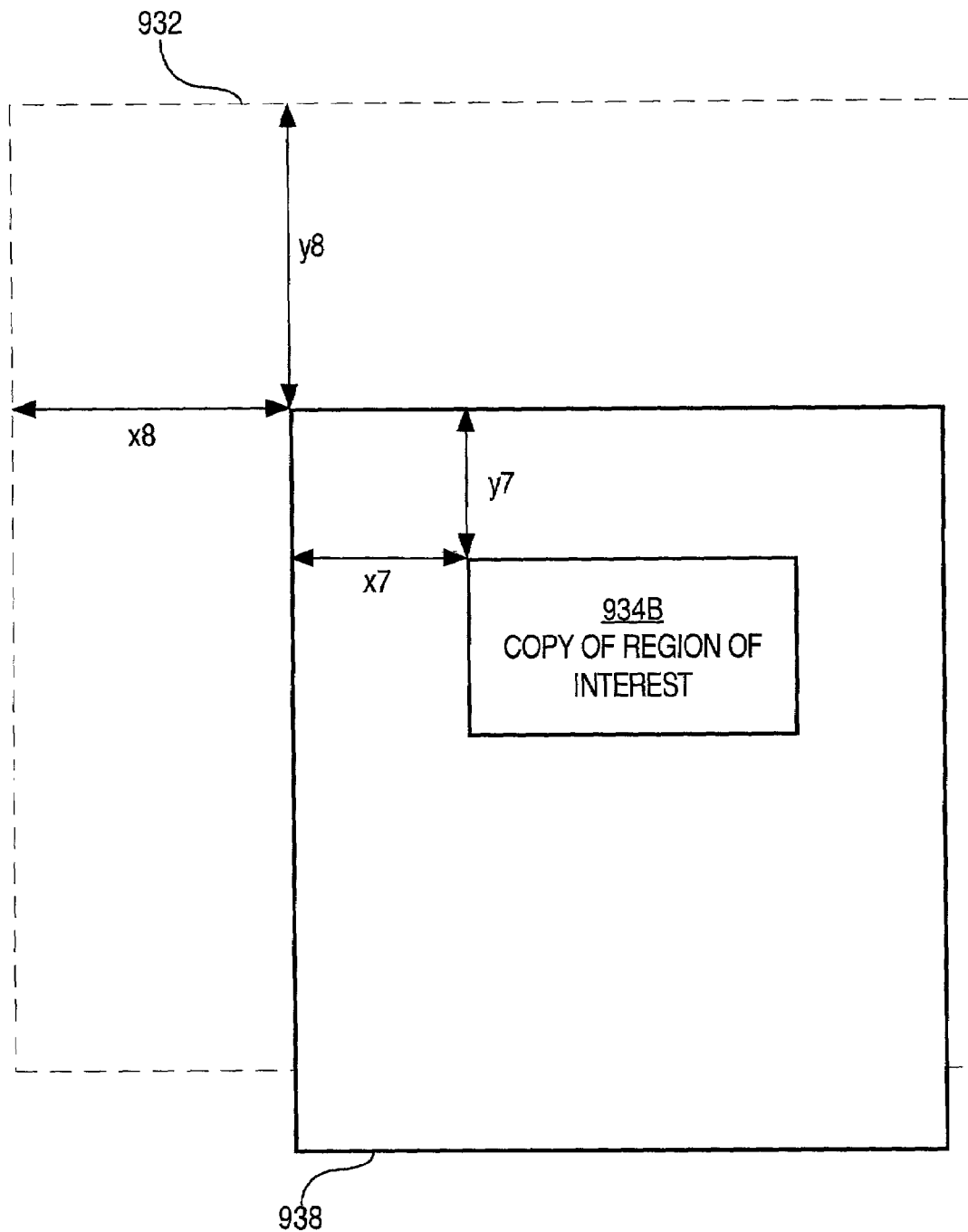
FIG. 9E is a simplified block diagram of a target electronic document.

Referring now to FIG. 9B, which shows further steps in the process of FIG. 9A, in block 916, information is received defining a position within the target electronic document at which the region of interest is to appear. For example, the user specifies at what position in the target electronic document he or she wishes the region of interest from the source electronic document appear. This position is stored as the pair (x7, y7) as shown in FIG. 9E.

In block 918, an offset value is determined for embedding the region of interest in the target electronic document. In one embodiment, the application calculates the amount by which the source electronic document must be offset from the target electronic document when it is embedded. This offset value is represented by the pair (x8, y8) of FIG. 9E, where x8=x5−x7 and y8=y5−y7.

In block 920, code is generated for carrying out the embedding, and the code is inserted into the target electronic document. In one embodiment, the application inserts new HTML code into the target electronic document. The inserted HTML code embeds the source electronic document in the target electronic document, clips the source electronic document so that only the region is interest is visible, and offsets the source electronic document so that the region of interest appears at the position specified by the user. Any set of one or more HTML tags that can accomplish these functions is suitable and may be used. An example of a specific excerpt of code is provided in TABLE 1.

TABLE 1

CODE EXAMPLE

```
<div style="position:absolute; top:-y8px; left:-x8px;
clip:rect(y5 x5+x6 y5+y6 x5);">
<iframe src="http://page1.html" height=y4 width=x4 scrolling=no>
</iframe>
</div>
```

The code of TABLE 1 may be inserted anywhere within the <body> tag of the target electronic document 938. In block 922, the target electronic document is rendered and displayed, e.g., in a Web browser. The resulting target electronic document is displayed with a copy of the region of interest 934B at the appropriate location.

As a result, a region of interest is conceptually cut or clipped from one electronic document and pasted into or displayed in a target electronic document. Using this approach, the user may transfer complex graphical features embodied in one an electronic document or Web page to another electronic document or Web page. The user can carry out such a transfer without having to rewrite or copy the underlying HTML source code, using simple point-and-click techniques.

VI. Additional Features and Benefits

Thus, in one aspect, an embodiment provides a method and apparatus for publishing, selecting, aggregating, organizing, synthesizing, and presenting content on the Internet. In prior approaches, remote intermediary servers are required for content to be delivered to end-users. In the present approach, the use of TCP/IP loopback permits server components to be moved to end-user computers such that intermediary servers are no longer needed.

Further, in other approaches, a proprietary content viewer is sometimes required. The use of TCP/IP loopback permits the personal server to interoperate with any end-user Web browser. An end-user's content selection choices must be delivered over the Internet to the intermediary server, exposing the end-user to eavesdroppers. The integrated nature of the personal server disclosed herein does not require selection choices to be delivered over the Internet, enhancing privacy.

The integrated nature of the personal server also enhances performance, since selection and layout choices do not need to be delivered over potentially slow Internet connections. The integrated nature of the personal server also enhances simplicity by tying closely together components that in other approaches are distributed over a number of computers.

In prior approaches, the synthesized Web page must be delivered to the end-user computer over his or her Internet connection, which is often slow and leads to high page load latency. In the present approach, the use of TCP/IP loopback dramatically reduces page load latency. As a result of the reduction in page load latency, the complexity and sophistication of those pages may increase considerably.

In other approaches, if the intermediary server is under heavy load, performance for each end-user diminishes. In the present approach, because each end-user uses his or her own TCP/IP loopback connection to load pages, performance remains constant regardless of the number of global users of the personal server. Further, in other approaches, if the intermediary server is out of service, no end-user can access her page. In the present approach, because each end-user uses her own TCP/IP loopback connection, her page is unavailable only when her own computer is out of service, in which case the point is moot.

In other approaches, if a channel provider server computer is out of service, the channel raw data stream is unavailable. In the present approach, channel raw data streams are distributed over the Internet's e-mail infrastructure, eliminating the problem of a single point of failure.

In other approaches, channel publishing requires expensive hardware, a dedicated connection to the Internet, and expertise in configuring and maintaining software. In the present approach, any end-user with only an intermittent Internet connection and a modest personal computer can publish a channel with no specific expertise.

In another aspect, a method and apparatus are provided for fine-grained security control over applets restricted to a sandbox. In other approaches, an applet downloaded to a Web browser is placed in a sandbox, which provides a very coarse granularity of security control. The present approach provides a layer of control with fine granularity of security control, and provides a method for causing an applet to be loaded from the local host.

In other approaches, applets cannot access network servers other than the one from which it was loaded. In the present approach, they can access any network server. Further, in other approaches, applets cannot access local resources like other processes and local storage. In the present approach, they can. A related problem of other approaches is that cross-applet communication is dependent on Web browser support. In the present approach, cross-applet communication is enabled regardless of the browser.

In another aspect, embodiments provide a method and apparatus for an alternative private naming system on the Internet. In other approaches, using an alternative naming system other than DNS requires a modified Web browser. The present approach provides alternative naming with any browser, or any other TCP/IP application. Further, in other approaches, alternative naming requires a centralized server to maintain name mappings. In the present approach, no such centralized server is required. This eliminates a centralized point of failure. In still other approaches, alternative naming is global, and does not allow two different users to use the same name to refer to different addresses. The present approach permits two different users to use the same name to refer to different addresses.

In another aspect, embodiments provide a method and apparatus for disclosure-free targeted advertising on the Internet. In past approaches, targeted advertising requires disclosure of personal information of the end-user to the advertiser. In the present approach, no disclosure is required, protecting end-user privacy. In other approaches, the advertiser's decision process is kept at the advertiser. In the present approach, the decision process is distributed to end-users.

In yet another aspect, embodiments provide a method and apparatus for intercommunication between intermittently connected network nodes over e-mail infrastructure on the Internet. In past approaches, software processes running on intermittently connected nodes of a network have no way to communicate when no connection is present. The present approach allows this to occur. The present approach uses ubiquitous e-mail infrastructure on the Internet. This means that no additional infrastructure is necessary, and the system can be implemented with little cost. Any improvements to the e-mail infrastructure made by third-parties will immediately benefit this scheme.

In still another aspect, embodiments provide a method and apparatus for clipping Web pages and embedding them in other pages. In past approaches, clipping a Web page involves parsing its HTML code and directly embedding a subset of the HTML code into another page. In the present approach, HTML parsing is not required, and the page to be clipped is embedded geometrically.

While the foregoing features may be provided by certain embodiments, the foregoing is not intended as a statement of required features, advantages, or characteristics of any specific embodiment. The appended claims set forth the scope of the invention.

VII. Hardware Overview

Figure 10:
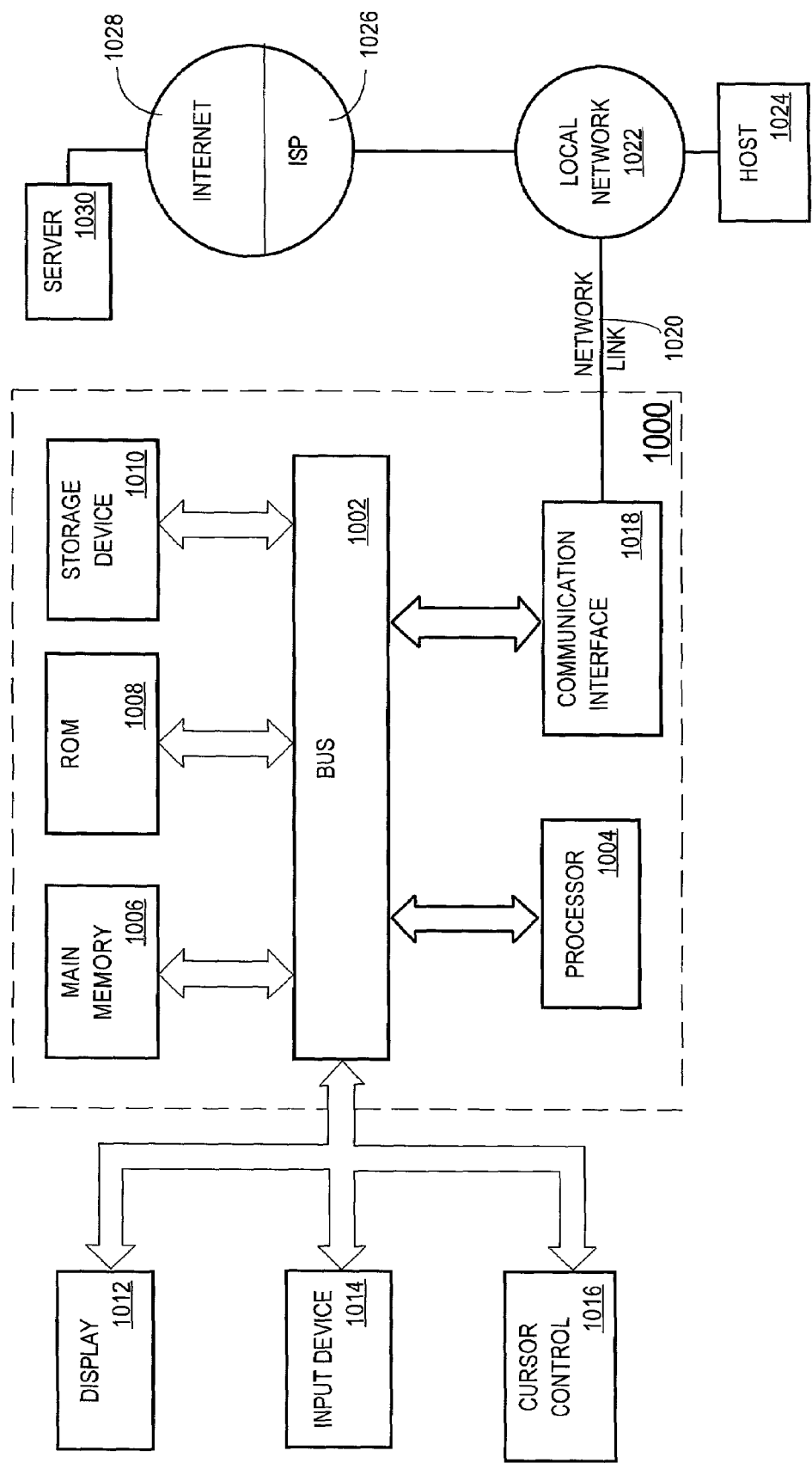
FIG. 10 is a block diagram that illustrates a computer system upon which an embodiment may be implemented.

FIG. 10 is a block diagram that illustrates a computer system 1000 upon which an embodiment of the invention may be implemented.

Computer system 1000 includes a bus 1002 or other communication mechanism for communicating information, and a processor 1004 coupled with bus 1002 for processing information. Computer system 1000 also includes a main memory 1006, such as a random access memory ("RAM") or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory ("ROM") 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube ("CRT") or liquid crystal display, for displaying information to a computer user. An input device 1014, including alphanumeric and other keys, is coupled to bus 1002 for communicating information and command selections to processor 1004. Another type of user input device is cursor control 1016, such as a mouse, a trackball, pen, stylus, alphanumeric keypad, thumb wheel such as the Sony JogDial, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for providing improved network content distribution using a personal server approach. According to one embodiment of the invention, improved network content distribution using a personal server approach is provided by computer system 1000 in response to processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1004 for execution. Such a medium may take many forms, including but not limited to, non-volatile media, volatile media, and transmission media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network ("ISDN") card or a modem to provide a data communication connection to a corresponding type of telephone line. As another example, communication interface 1018 may be a local area network ("LAN") card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider ("ISP") 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. In accordance with the invention, one such downloaded application provides for improved network content distribution using a personal server approach as described herein.

The received code may be executed by processor 1004 as it is received, and/or stored in storage device 1010, or other non-volatile storage for later execution. In this manner, computer system 1000 may obtain application code in the form of a carrier wave.

EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of displaying one or more periodically updated channels of electronic information received over a network from a content server, the method comprising the computer-implemented steps of:

initiating execution, in an end-user computer that is coupled over a public network to one or more content servers, of a personal server software that is hosted within the end-user computer;

receiving and storing at the end-user computer, content channel information defining a plurality of content channels available from a plurality of sources associated with the one or more content servers;

selecting a subset of channels from among the plurality of available content channels;

periodically retrieving updated channel content for the subset of channels from the content servers across the public network, without communicating the channel selection information across the network;

synthesizing one or more original, personalized electronic documents from the updated channel content from various sources;

displaying the one or more documents;

wherein the receiving, storing, selecting, retrieving and synthesizing are carried out by the personal server software that executes at the end-user computer.

2. A method as recited in claim 1, further comprising the steps of allowing the user to create and store at the end-user computer, custom, personalized virtual space organization information defining a spatial organization of content for the subset of channels, and wherein the step of synthesizing one or more electronic documents comprises the step of synthesizing one or more electronic documents that contain the updated channel content from various sources based on the virtual space information.

3. A method as recited in claim 2, wherein the step of periodically retrieving updated channel content further comprises the steps of:

receiving an update specification for one channel among the subset of selected channels;

identifying an update method and time value within the update specification;

in accordance with the update specification, issuing a request for updated content data created after the time value, using the update method.

4. A method as recited in claim 1, further comprising the steps of receiving information defining a plurality of rendering contexts, wherein each of the rendering contexts is associated with one of the selected channels, and wherein the step of synthesizing one or more electronic documents comprises the step of rendering the electronic documents using the rendering context that is associated with one of the selected channels from which the updated channel content was obtained.

5. A method as recited in claim 4, wherein each rendering context comprises a style sheet, template, script, helper reference, or applet.

6. A method as recited in claim 4, wherein the rendering context comprises a Cascading Style Sheet document, the updated channel content comprises HTML data, and wherein the synthesizing step comprises combining the rendering context with the updated channel content to result in creating and storing an HTML page that is capable of display by a browser.

7. A method as recited in claim 4, wherein the rendering context comprises a script, and wherein the synthesizing step comprises applying the updated channel content to the script as input, executing the script, and receiving output from the script that is capable of display by a browser.

8. A method as recited in claim 7, wherein the steps of receiving, selecting, retrieving, synthesizing, and displaying are carried out by a personal server software that is executed at the end-user computer, and wherein the script is executed by an embedded processor in the personal server software.

9. A method as recited in claim 4, wherein the rendering context comprises a reference to a program that is stored at the end-user computer, and wherein the synthesizing step comprises executing the program using the updated channel content as input and receiving output from the program that is capable of display by a browser.

10. A method as recited in claim 4, wherein the rendering context comprises an applet, and wherein the synthesizing step comprises executing the applet using the updated channel content as input and displaying programmatic output from the applet using a browser.

11. A method as recited in claim 1, further comprising the steps of:

identifying whether the updated channel content contains an identification of an embedded channel;

requesting second updated channel content for the embedded channel.

12. A method as recited in claim 1, wherein the step of synthesizing one or more electronic documents further comprises the steps of:
receiving the updated channel content, a virtual space specification, and a page organization specification;
replacing one or more tokens in the updated channel content with other channel content information or personal content information located on the end-user computer;
iterating the replacing step over all updated channel content for all channels that are identified in the channel selection information.

13. A method as recited in claim 1, wherein the step of synthesizing one or more electronic documents further comprises the steps of
receiving the updated channel content, a virtual space specification, and a page organization specification;
receiving information defining a plurality of rendering contexts, wherein each of the rendering contexts is associated with one of the selected channels;
replacing one or more tokens in the updated channel content with other channel content information or personal content information located on the end-user computer;
iterating the replacing step over all updated channel content for all channels that are identified in the second information;
creating one or more static content elements in an electronic document based on a rendering context that is associated with one of the selected channels from which the updated channel content was obtained.

14. A method as recited in claim 1, further comprising the step of generating and displaying a user interface display that includes a list of available channels, wherein the list of available channels is created based on issuing a query to a channel database that is stored in association with a personal server software executed at the end-user computer that carries out the synthesizing and displaying steps.

15. A method as recited in claim 1, further comprising the step of generating and displaying a user interface display that includes a list of available channels, wherein the list of available channels is created based on issuing a query to a channel database that is stored in association with a personal server software executed at the end-user computer that carries out the synthesizing and displaying steps, and based on a user-specific channel topology that is retrieved from the channel database.

16. A method as recited in claim 1, further comprising the steps of rescheduling the retrieving step when the updated channel content cannot be retrieved immediately.

17. A method as recited in claim 1, wherein displaying the one or more electronic documents comprises the steps of delivering the electronic documents from a personal server software executed in the end-user computer to a browser executed in the end-user computer over a TCP/IP loopback interface of the end-user computer.

18. A method as recited in claim 1, wherein displaying the one or more electronic documents comprises the steps of:
providing a Web server and a browser in association with the end-user computer;
loading one or more virtual display spaces from a personal server software that is provided in the end-user computer;
generating a view of the one or more virtual display spaces by using the browser to request the one or more virtual display spaces from the Web server over a loopback interface of the end-user computer.

19. A method as recited in claim 18, wherein the step of generating a view includes the step of directing the browser to display information located at a hostname that is associated with the loopback interface of the end-user computer.

20. A method as recited in claim 18, further comprising the steps of:
binding the Web server of the end-user computer to a pre-defined port that is associated with the loopback interface of the end-user computer;
placing the Web server in a listening mode;
using the browser, issuing a display request to a hostname that is associated with the loopback interface.

21. A method as recited in claim 18, further comprising the steps of:
examining the IP address of the request;
determining whether requests from the IP address are permitted to view the virtual display space, based on a stored mapping of IP addresses to identifiers of virtual display spaces;
generating a view of the electronic documents from the virtual display space only when requests from the IP address are permitted to view the virtual display space.

22. A method as recited in claim 18, further comprising the steps of:
rendering the requested one or more documents from the loaded virtual display space using a Web page synthesizer that is provided in the personal server software;
providing the rendered one or more electronic documents to the Web server;
serving the rendered one or more electronic documents from the Web server to the browser over the loopback interface.

23. A method as recited in claim 18, wherein the embedded Web server is a proxy server that binds to an arbitrary port.

24. A computer-readable storage medium carrying one or more sequences of instructions for displaying one or more periodically updated channels of electronic information received over a network from a content server, which instructions, when executed by one or more processors, cause the one or more processors to carry out the steps of:
initiating execution, in an end-user computer that is coupled over a public network to one or more content servers, of a personal server software that is hosted within the end-user computer;
receiving and storing at the end-user computer, content channel information defining a plurality of content channels available from a plurality of various sources associated with the one or more content servers;
selecting a subset of channels from among a plurality of available content channels;
periodically retrieving updated channel content for the subset of channels from the content servers across the public network, without communicating the channel selection information across the network;
synthesizing one or more original, personalized electronic documents from the updated channel content from various sources;
displaying the one or more documents;
wherein the receiving, storing, selecting, retrieving and synthesizing are carried out by the personal server software that executes at the end-user computer.

25. An apparatus for displaying one or more periodically updated channels of electronic information received over a network from a content server, comprising:
means for initiating execution, in an end-user computer that is coupled over a public network to one or more content servers, of a personal server software that is hosted within the end-user computer;

means for receiving and storing at the end-user computer, content channel information defining a plurality of content channels available from a plurality of sources associated with the one or more content servers;

means for selecting a subset of channels from among a plurality of available content channels;

means for periodically retrieving updated channel content for the subset of channels from the content servers across the public network, without communicating the channel selection information across the network;

means for synthesizing one or more original, personalized electronic documents from the updated channel content from various sources;

means for displaying the one or more documents;

wherein the personal server software that executes at the end-user computer comprises the receiving, storing, selecting, retrieving and synthesizing means.

26. An apparatus for displaying one or more periodically updated channels of electronic information received over a network from a content server, comprising:

a network interface that is coupled to the data network for receiving one or more packet flows therefrom;

one or more processors;

one or more stored sequences of instructions which, when executed by the processors, cause the processors to carry out the steps of:

initiating execution, in an end-user computer that is coupled over a public network to one or more content servers, of a personal server software that is hosted within the end-user computer;

receiving and storing at the end-user computer, content channel information defining a plurality of content channels available from a plurality of various sources associated with the one or more content servers;

selecting a subset of channels from among a plurality of available content channels;

periodically retrieving updated channel content for the subset of channels from the content servers across the public network, without communicating the channel selection information across the network;

synthesizing one or more original, personalized electronic documents from the updated channel content from various sources;

displaying the one or more documents;

wherein the receiving, storing, selecting, retrieving and synthesizing are carried out by the personal server software that executes at the end-user computer.

27. A personal server software that executes at and is hosted within a end-user computer and is capable of displaying one or more periodically updated channels of electronic information received over a network from one or more content servers that are coupled through the network to the end-user computer, comprising:

a channel manager configured to receive and store, in a channel database of the personal server software, channel selection information defining a subset of channels that are selected from among a plurality of available content channels associated with the one or more content servers, and to periodically retrieve updated channel content for the subset of channels from the content servers across the public network, without communicating the channel selection information across a network;

a page synthesizer configured to synthesize one or more original, personalized electronic documents that contain the updated channel content from various sources and to provide the one or more electronic documents to a browser for display.

28. A personal server software as recited in claim 27, further comprising:

a virtual space designer configured to receive and store virtual space organization information defining an organization of content for the subset of channels within a virtual display space;

a virtual space manager configured to synthesize one or more original, personalized electronic documents that contain the updated channel content based on the virtual space organization information in coordination with the page synthesizer.

29. An apparatus as recited in claim 25, further comprising means for allowing the user to create and store at the end-user computer, custom, personalized virtual space organization information defining a spatial organization of content for the subset of channels, and wherein the means for synthesizing one or more electronic documents comprises means for synthesizing one or more electronic documents that contain the updated channel content from various sources based on the virtual space information.

30. An apparatus as recited in claim 25, further comprising means for receiving information defining a plurality of rendering contexts, wherein each of the rendering contexts is associated with one of the selected channels, and wherein the means for synthesizing one or more electronic documents comprises means for rendering the electronic documents using the rendering context that is associated with one of the selected channels from which the updated channel content was obtained.

31. An apparatus as recited in claim 25, wherein the means for synthesizing one or more electronic documents further comprises:

means for receiving the updated channel content, a virtual space specification, and a page organization specification;

means for replacing one or more tokens in the updated channel content with other channel content information or personal content information located on the end-user computer;

means for iterating the replacing step over all updated channel content for all channels that are identified in the channel selection information.

32. An apparatus as recited in claim 25, wherein the means for displaying the one or more electronic documents comprises means for delivering the electronic documents from a personal server software executed in the end-user computer to a browser executed in the end-user computer over a TCP/IP loopback interface of the end-user computer.

33. An apparatus as recited in claim 25, wherein the means for displaying the one or more electronic documents comprises:

means for providing a Web server and a browser in association with the end-user computer;

means for loading one or more virtual display spaces from a personal server software that is provided in the end-user computer;

means for generating a view of the one or more virtual display spaces by using the browser to request the one or more virtual display spaces from the Web server over a loopback interface of the end-user computer.

34. An apparatus as recited in claim 26, further comprising instructions which when executed cause allowing the user to create and store at the end-user computer, custom, personalized virtual space organization information defining a spatial organization of content for the subset of channels, and wherein the instructions for synthesizing one or more electronic documents comprise instructions which when executed cause synthesizing one or more electronic documents that contain the updated channel content from various sources based on the virtual space information.

35. An apparatus as recited in claim 26, further comprising instructions which when executed cause receiving information defining a plurality of rendering contexts, wherein each of the rendering contexts is associated with one of the selected channels, and wherein the instructions for synthesizing one or more electronic documents comprise instructions which when executed cause rendering the electronic documents using the rendering context that is associated with one of the selected channels from which the updated channel content was obtained.

36. An apparatus as recited in claim 26, wherein the instructions for synthesizing one or more electronic documents further comprise instructions which when executed cause:
   receiving the updated channel content, a virtual space specification, and a page organization specification;
   replacing one or more tokens in the updated channel content with other channel content information or personal content information located on the end-user computer;
   iterating the replacing step over all updated channel content for all channels that are identified in the channel selection information.

37. An apparatus as recited in claim 26, wherein the instructions for displaying the one or more electronic documents comprise instructions which when executed cause delivering the electronic documents from a personal server software executed in the end-user computer to a browser executed in the end-user computer over a TCP/IP loopback interface of the end-user computer.

38. An apparatus as recited in claim 26, wherein the instructions for displaying the one or more electronic documents comprise instructions which when executed cause:
   providing a Web server and a browser in association with the end-user computer;
   loading one or more virtual display spaces from a personal server software that is provided in the end-user computer;
   generating a view of the one or more virtual display spaces by using the browser to request the one or more virtual display spaces from the Web server over a loopback interface of the end-user computer.

* * * * *